(12) United States Patent
Roberts et al.

(10) Patent No.: US 10,613,017 B2
(45) Date of Patent: Apr. 7, 2020

(54) BIEXPONENTIAL TRANSFORMATION FOR PARTICLE SORTERS

(71) Applicant: BECTON, DICKINSON AND COMPANY, Franklin Lakes, NJ (US)

(72) Inventors: David A. Roberts, San Jose, CA (US); Christopher J. Wolf, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 16/393,855

(22) Filed: Apr. 24, 2019

(65) Prior Publication Data

US 2019/0331587 A1   Oct. 31, 2019

Related U.S. Application Data

(60) Provisional application No. 62/663,086, filed on Apr. 26, 2018.

(51) Int. Cl.
*G01N 15/14* (2006.01)
*G01N 15/10* (2006.01)

(52) U.S. Cl.
CPC .  *G01N 15/1429* (2013.01); *G01N 2015/1006* (2013.01); *G01N 2015/149* (2013.01); *G01N 2015/1481* (2013.01)

(58) Field of Classification Search
CPC .................................................. G01N 15/1429
See application file for complete search history.

(56) References Cited

U.S. PATENT DOCUMENTS

| 5,136,690 | A | 8/1992 | Becker |
| 7,382,370 | B2 | 6/2008 | Layne |
| 9,064,334 | B2 * | 6/2015 | Patel ........................ G06T 15/50 |

(Continued)

FOREIGN PATENT DOCUMENTS

WO    WO2007091081 A2    8/2007

OTHER PUBLICATIONS

FlowJo v1 0.0. 7 Documentation, FlowJo, LLC, available at https://web.archive.org/web/20160502023639/http:l/docs.flowjo.com/vx/, 2016, 138 pages.

*Primary Examiner* — Edward Park
(74) *Attorney, Agent, or Firm* — Bret E. Field; Bozicevic, Field & Francis LLP

(57) ABSTRACT

Aspects of the present disclosure include methods for generating a bitmap from a data plot of light detected from particles in a flow stream. Methods according to certain embodiments include detecting light from particles in a flow stream, generating a data plot of measurements of the detected light, where the data plot includes one or more regions each having a population of particles, calculating a set of vertices that form a boundary for each region in the data plot, identifying a type of algorithmic transformation associated with each vertex in the set of vertices, generating a bitmap of each region of particles such that the bitmap of each region includes a set of vertices that correspond to the vertices of each region in the data plot and identifying an algorithmic transformation for applying to each vertex in the bitmap of each region. Systems and integrated circuit devices (e.g., field programmable gate arrays) having programming for generating a bitmap according to the subject methods are also provided.

20 Claims, 7 Drawing Sheets

(56) References Cited

U.S. PATENT DOCUMENTS

| | | |
|---|---|---|
| 9,350,763 B1 | 5/2016 | McHugh |
| 2004/0119029 A1 | 6/2004 | Nagata |
| 2004/0143423 A1 | 7/2004 | Parks |
| 2008/0119421 A1 | 5/2008 | Tuszynski |
| 2008/0263468 A1 | 10/2008 | Cappione |
| 2009/0196511 A1 | 8/2009 | Gendron |
| 2009/0307248 A1 * | 12/2009 | Moser |
| 2010/0091028 A1 * | 4/2010 | Grossman ............... G06T 15/04 345/587 |
| 2011/0191359 A1 | 8/2011 | Larrriba |
| 2012/0202237 A1 | 8/2012 | Sedoglavich |
| 2012/0220837 A1 | 8/2012 | Alpert |
| 2014/0222381 A1 | 8/2014 | Nitta |

* cited by examiner

BIEXPONENTIAL TRANSFORMATION FOR PARTICLE SORTERS

CROSS-REFERENCE TO RELATED APPLICATION

Pursuant to 35 U.S.C. § 119(e), this application claims priority to the filing date of U.S. Provisional Patent Application Ser. No. 62/663,086, filed Apr. 26, 2018; the disclosure of which application is incorporated herein by reference.

FIELD

The present application generally relates to particle sorting systems and methods, specifically particle sorting systems and methods for controlling configuration of the sorting electronics in response to biexponential or other parameter transformations.

INTRODUCTION

Particle analyzers, such as flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

Cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as an "FCS" file format, for storing data from a flow cytometer facilitates analyzing data using separate programs and/or machines. Using current analysis methods, the data typically are displayed in 2-dimensional (2D) plots for ease of visualization, but other methods may be used to visualize multidimensional data.

The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multi-dimensional space defined by the parameters measured. Populations of cells or particles are identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; and 6,944,338; and U.S. Pat. Pub. No. 2012/0245889, each incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual cells can be distinguished according to their location in the fluid stream and the presence of detectable markers. Thus, a flow cytometer can be used to produce a diagnostic profile of a population of biological particles.

Isolation of biological particles has been achieved by adding a sorting or collection capability to flow cytometers. Particles in a segregated stream, detected as having one or more desired characteristics, are individually isolated from the sample stream by mechanical or electrical removal. This method of flow sorting has been used to sort cells of different types, to separate sperm bearing X and Y chromosomes for animal breeding, to sort chromosomes for genetic analysis, and to isolate particular organisms from complex biological population.

Gating is used to help make sense of the large quantity of data that may be generated from a sample. Given the large quantities of data presented for a given sample, there exists a need to efficiently and accurately control the graphical display of the data to provide a consistent view even after transforming the data.

SUMMARY

The systems, methods, and devices of the disclosure each have several innovative aspects, no single one of which is solely responsible for the desirable attributes disclosed herein.

Aspects of the present disclosure include methods for generating a bitmap from a data plot of measured light from particles in a flow stream. Methods according to certain embodiments include detecting light from particles in a flow stream, generating a data plot of measurements of the detected light, where the data plot includes one or more regions each having a population of particles, calculating a set of vertices that form a boundary for each region in the data plot, identifying a type of algorithmic transformation associated with each vertex in the set of vertices, generating a bitmap of each region of particles such that the bitmap of each region includes a set of vertices that correspond to the vertices of each region in the data plot and identifying an algorithmic transformation for applying to each vertex in the bitmap of each region. In embodiments, the algorithmic transformation applied to each vertex in the bitmap is the same type of algorithmic transformation associated with each corresponding vertex in the data plot.

In embodiments, light from particles is detected from the flow stream. In some embodiments, methods include detecting one or more of light absorption, light scatter, light emission (e.g., fluorescence) from the flow stream. In some instances, a data plot of measured light from the particles is generated from detected light absorption (e.g., brightfield image data). In other instances, a data plot of measured light from the particles is generated from detected light scatter (e.g., forward scatter image data, side scatter image data). In yet other instances, a data plot of measured light from the particles is generated from detected fluorescence (e.g., fluorescent marker image data). In still other instances, a data plot of measured light from the particles is generated from a combination of two or more of detected light absorption, detected light scatter and detected fluorescence.

In some embodiments, calculating a set of vertices that form the boundary for each region of particle population in the data plot includes determining the minimum value and maximum value along each axis of the data plot for each vertex. For example, the minimum value and maximum value along the x-axis and y-axis of the data plot is determined for each vertex. Each vertex is associated with an algorithmic transformation. In embodiments, the algorithmic transformation for each vertex of the regions of particle populations may be a linear numerical transformation, a logarithmic numerical transformation, a biexponential numerical transformation or a combination thereof. In some embodiments, when the algorithmic transformation associated with a vertex in the data plot is linear, methods include identifying a linear transformation for applying to the corresponding vertex in the bitmap. In other embodiments, when the algorithmic transformation associated with a vertex in the data plot is logarithmic, methods include identifying a logarithmic transformation for applying to the corresponding vertex in the bitmap. In still other embodiments, when the algorithmic transformation associated with a vertex in the data plot is biexponential, methods include identifying a transformation for applying to the corresponding vertex in the bitmap that comprises two or more of a symmetric logarithmic transformation; and a linear transformation. In some embodiments, the algorithmic transformations that are applied to the bitmap are aligned. In some instances, an affine transformation is applied to the bitmap.

Methods according to certain embodiments include generating two or more tiled bitmaps for the data plot, such as a bitmap that includes 3 or more tiles, 4 or more tiles, 5 or more tiles, 6 or more tiles, 7 or more tiles, 8 or more tiles and including 9 or more tiles. In these embodiments, an algorithmic transformation for applying to each vertex in each bitmap tile may be identified. The bitmap may be generated by drawing a polygon corresponding to the region of the data plot. For example, the bitmap may be generated with a polygon drawing algorithm such as a polygon scanline fill algorithm.

In some embodiments, methods further include generating a sort decision for particles of a region based on the generated bitmap. In some instances, the sort decision is generated based on the bitmap with a truth table. In other instances, the sort decision is generated based on the bitmap with one or more logical OR gates. In certain instances, the sort decision is generated based on the bitmap with a hierarchy of logical OR gates. In certain embodiments, the particles in the flow stream are cells from a biological sample. In these embodiments, methods include generating a data plot having different regions of cell populations, generating a bitmap as described herein and generating a sort decision for each population of cells in the sample based on the generated bitmap. In certain embodiments, methods further include sorting the cells with a cell sorting system, such as a flow cytometer having a droplet deflector.

Aspects of the present disclosure also include systems for generating a bitmap from a data plot of measured light from particles in a flow stream. Systems according to certain embodiments include a light source configured to irradiate particles in a flow stream, a light detection system having one or more photodetectors and a processor comprising memory operably coupled to the processor wherein the memory includes instructions stored thereon, which when executed by the processor, cause the processor to: generate a data plot of measurements of the detected light, such that the data plot includes one or more regions each having a population of particles; calculate a set of vertices that form a boundary for each region in the data plot; identify a type of algorithmic transformation associated with each vertex in the set of vertices; and generate a bitmap of each region of particles, such that the bitmap of each region includes a set of vertices that correspond to the vertices of each region in the data plot; and identify an algorithmic transformation for applying to each vertex in the bitmap of each region. In embodiments, the light detection system includes a photodetector configured to detect one or more of light absorption, light scatter and fluorescence or a combination thereof.

In some embodiments, systems include a processor with memory operably coupled to the processor such that the memory includes instructions stored thereon, which when executed by the processor, cause the processor to calculate the set of vertices that form the boundary for each region in the data plot by determining the minimum value and maximum value along each axis of the data plot for each vertex. The algorithmic transformation for each vertex of the regions of particle populations may be a linear numerical transformation, a logarithmic numerical transformation, a biexponential numerical transformation or a combination thereof. In some embodiments, the memory includes instructions stored thereon, which when executed by the processor, cause the processor to identify a linear transformation for applying to a vertex in the bitmap when the algorithmic transformation associated with the corresponding vertex in the data plot is linear. In other embodiments, the memory includes instructions stored thereon, which when executed by the processor, cause the processor to identify a logarithmic transformation for applying to a vertex in the bitmap when the algorithmic transformation associated with the corresponding vertex in the data plot is logarithmic. In still other embodiments, the memory includes instructions stored thereon, which when executed by the processor, cause the processor to identify a transformation for applying to a vertex in the bitmap having two or more of a symmetric logarithmic transformation a linear transformation when the algorithmic transformation associated with the corresponding vertex in the data plot is biexponential. In some embodiments, the subject systems are configured to align the algorithmic transformations applied to the bitmap. In certain instances, systems are configured to apply an affine transformation to the bitmap.

Systems according to certain embodiments are configured to generate two or more tiled bitmaps for the data plot, such as a bitmap that includes 3 or more tiles, 4 or more tiles, 5 or more tiles, 6 or more tiles, 7 or more tiles, 8 or more tiles and including 9 or more tiles. In these embodiments, an algorithmic transformation for applying to each vertex in each bitmap tile may be identified. Systems of interest may be configured to generate the bitmap by drawing a polygon corresponding to the region of the data plot. For example, the bitmap may be generated with a polygon drawing algorithm such as a polygon scanline fill algorithm.

In some embodiments, systems are configured to generate a sort decision for particles of a region based on the generated bitmap. In some instances, the sort decision component (e.g., sort module) generates a sort decision based on the bitmap with a truth table. In other instances, the sort decision component generates a sort decision based on the bitmap with one or more logical OR gates. In certain instances, the sort decision component employs a hierarchy of logical OR gates to generate a sort decision. In certain embodiments, the particles in the flow stream are cells from a biological sample. In some instances, systems further include a droplet sorter for sorting components of a sample in a flow stream.

Aspects of the present disclosure also include integrated circuit devices programmed to: generate a data plot comprising measurements of the detected light, where the data plot includes one or more regions each having a population of particles; calculate a set of vertices that form a boundary for each region in the data plot; identify a type of algorithmic transformation associated with each vertex in the set of vertices; and generate a bitmap of each region of particles, such that the bitmap of each region includes a set of vertices that correspond to the vertices of each region in the data plot; and identify an algorithmic transformation for applying to each vertex in the bitmap of each region. Integrated circuit devices of interest may include, in certain instances, a field programmable gate array (FPGA), an application specific integrated circuit (ASIC) or a complex programmable logic device (CPLD).

In some embodiments, the present disclosure provides a control device for configuring a particle analyzer to collect specified particles is provided. The control device includes an input device port configured to receive messages from input devices; an event listener in data communication with the input device port, the event listener configured process the messages received from the input devices; a computer-readable memory storing executable instructions; and one or more computer processors in communication with the computer-readable memory. The one or more computer processors are configured to execute the executable instructions. The executable instructions cause the control device to provide a graphic display including a first plot including a first axis, where the first plot includes a first selection identifying a first area of the first plot for a population of particle measurements. The executable instructions cause the control device to receive, from a first input device via the input device port, a request for a scaling adjustment to the first axis. The executable instructions also cause the control device to determine a number of regions for dividing the first axis based at least in part on the scaling adjustment and resources available to the particle analyzer that will process a sample; divide the first axis into the number of regions; identify a first transformation for the first region; identify a second transformation for the second region; generating, for a first portion of the first selection defined by a first set of vertices, where the first portion is within the first region, a first set of translated vertices using the first set of vertices and the first transformation; generate, for a second portion of the first selection defined by a second set of vertices, where the second portion is within the second region, a second set of translated vertices using the second set of vertices and the second transformation; and combine the first set of translated vertices with the second set of translated vertices to form a second selection. The executable instructions also cause the control device to generate a sort configuration based at least in part on the second selection, where the sort configuration comprises at least one of a truth table or a hierarchy of logical OR gates and configure the particle analyzer for sorting particles from the sample using the sort configuration. Other embodiments of this aspect include corresponding computer systems, apparatus, and computer programs recorded on one or more computer storage devices, each configured to perform the at least a portion of the innovative features described.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
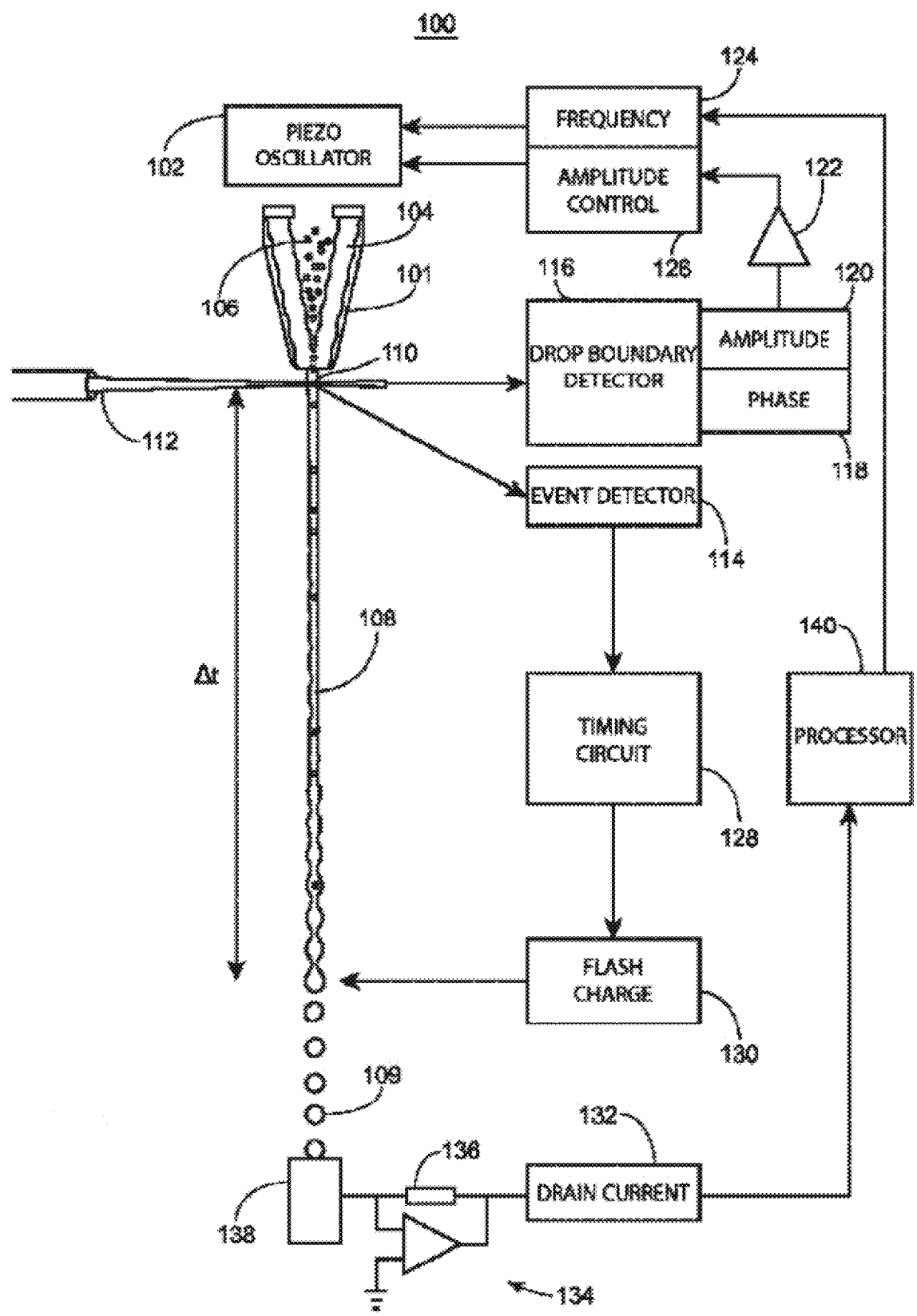
FIG. 1 is a schematic drawing of a cell sorter system 100, in accordance with one embodiment presented herein.

Aspects of the present disclosure include methods for generating a bitmap from a data plot of light detected from particles in a flow stream. Methods according to certain embodiments include detecting light from particles in a flow stream, generating a data plot of measurements of the detected light, where the data plot includes one or more regions each having a population of particles, calculating a set of vertices that form a boundary for each region in the data plot, identifying a type of algorithmic transformation associated with each vertex in the set of vertices, generating a bitmap of each region of particles such that the bitmap of each region includes a set of vertices that correspond to the vertices of each region in the data plot and identifying an algorithmic transformation for applying to each vertex in the bitmap of each region. Systems and integrated circuit devices (e.g., field programmable gate arrays) having programming for generating a bitmap according to the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Sorting Particles of a Sample

Aspects of the present disclosure include methods for generating a bitmap from a data plot of measured light from particles in a flow stream. Methods according to certain embodiments include detecting light from particles in a flow stream, generating a data plot of measurements of the detected light, where the data plot includes one or more regions each having a population of particles, calculating a set of vertices that form a boundary for each region in the data plot, identifying a type of algorithmic transformation associated with each vertex in the set of vertices, generating a bitmap of each region of particles such that the bitmap of each region includes a set of vertices that correspond to the vertices of each region in the data plot and identifying an algorithmic transformation for applying to each vertex in the bitmap of each region. In embodiments, the algorithmic transformation applied to each vertex in the bitmap is the same type of algorithmic transformation associated with each corresponding vertex in the data plot.

In some embodiments, methods include sorting particles of a sample (e.g., cells in a biological sample). In practicing methods according to certain embodiments, a sample is irradiated with a light source and light from the sample is detected to generate a data plot having measurements of the detected light, where the data plot includes one or more regions each having a population of particles. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample having particles (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. As discussed above, the type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In practicing the subject methods, light from the irradiated sample is measured, such as by collecting light from the sample over a range of wavelengths (e.g., 200 nm-1000 nm). In embodiments, methods may include one or more of measuring light absorption by the sample (e.g., brightfield light data), measuring light scatter (e.g., forward or side scatter light data) and measuring light emission by the sample (e.g., fluorescence light data).

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Light may be collected over one or more of the wavelength ranges of 200 nm-1200 nm. In some instances, methods include measuring the light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, light from the sample is measured 2 or more times, with the data in certain instances being averaged.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to about 50 V, such as from about 2 V to about 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, methods include generating a data plot having measurements of the detected light where the data plot includes one or more regions each having a population of particles. The data plot may be generated from detected light absorption, detected light scatter, detected light emission or any combination thereof. In some instances, the data plot is generated from light absorption detected from the sample, such as from a brightfield light detector. In these instances, the data plot is generated based on brightfield image data from the cell in the flow stream. In other instances, the data plot is generated from light scatter detected from the sample, such as from a side scatter detector, a forward scatter detector or a combination of a side scatter detector and forward scatter detector. In yet other instances, the data plot is generated from emitted light from the sample, such as light from fluorophores added to the sample. In still other instances, the data plot is generated from a combination of detected light absorption, detected light scatter and detected light emission.

The data plot may include one or more regions that plot a population of particles, such as two or more regions, such as three or more regions, such as four or more regions and including five or more regions. As described in greater detail below, a bitmap of each region in the data plot is generated, which according to certain embodiments is used as a gate for sorting particles of that corresponding region. In practicing methods, the boundaries of each region in the data plot are determined. In some instances, to determine the boundary of a region of the data plot, methods include calculating a set of vertices that form the boundary for each region in the data plot by determining the minimum value and maximum value along each axis of the data plot for each vertex. In these embodiments, the minimum value along the x-axis and the minimum value along the y-axis as well as the maximum value along the x-axis and the maximum value along the y-axis are determined for each vertex.

Figure 3:
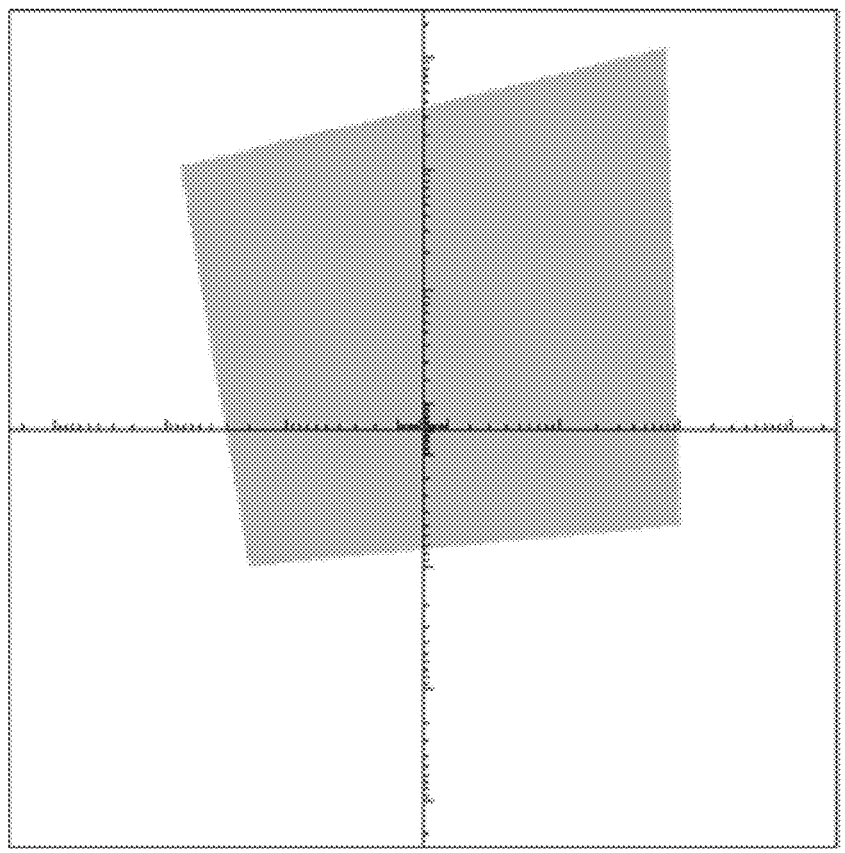
FIG. 3 shows an initial plot using biexponential scaling.

In embodiments, an algorithmic transformation that is associated with the vertices of each region of the data plot is determined. Depending on the type of data plot employed (e.g., a biexponential data plot), the algorithmic transformation identified for each vertex of the data plot may vary, such as being a linear numerical transformation, a logarithmic numerical transformation or a biexponential numerical transformation. The transformation may be positive or negative depending on the particle population position on the data plot. For example, the transformation may be a positive linear, positive logarithmic, negative linear or negative logarithmic transformation. FIG. 3 depicts a data plot according to certain embodiments having 9 areas where a particle population may be present. As such, algorithmic transformation identified may be a two-part algorithmic transformation for each axis (i.e., linear or logarithmic along the x-axis and y-axis). In some embodiments, the identified algorithmic transformation is a positive linear/positive linear transformation (i.e., a linear transformation along the positive x-axis and a linear transformation along the positive y-axis) In other embodiments, the identified algorithmic transformation is a positive logarithmic/positive logarithmic transformation. In other embodiments, the algorithmic transformation is a positive linear/positive logarithmic transformation. In other embodiments, the algorithmic transformation is a positive logarithmic/positive linear transformation. In other embodiments, the algorithmic transformation is a negative linear/negative logarithmic transformation. In other embodiments, the algorithmic transformation is a negative linear/positive logarithmic transformation. In other embodiments, the algorithmic transformation is a positive logarithmic/negative linear transformation.

A bitmap is generated for each particle population region in the data plot. The term bitmap is used herein in its conventional sense to refer to a mapping index of a region of the data plot. Bitmaps as described herein may be generated in the form of data or as a graphical display. In embodiments, bitmaps may be formed from a single tile or more than one tile. In some embodiments, two or more bitmap tiles are generated from the data plot, such as 3 or more bitmap tiles, such as 4 or more bitmap tiles, such as 5 or more bitmap tiles, such as 6 or more bitmap tiles, such as 7 or more bitmap tiles, such as 8 or more bitmap tiles and including 9 or more bitmap tiles. Each bitmap tile may include one or more vertices of the boundaries from each region of the particle population of interest, such as 2 or more vertices, such as 3 or more vertices, such as 4 or more vertices and including 5 or more vertices of each region of the particle population of interest.

In practicing the subject methods, an algorithmic transformation is identified for applying to each vertex in the bitmap. Depending on the type of data plot employed (e.g., a biexponential data plot), the algorithmic transformation identified for each vertex of the bitmap may vary, such as being a linear numerical transformation, a logarithmic numerical transformation or a biexponential numerical transformation. The transformation may be positive or negative depending on the particle population position on the data plot. In some embodiments, when the algorithmic transformation associated with a vertex in the data plot is linear, the method includes identifying a linear transformation for applying to the corresponding vertex in the bitmap. In other embodiments, when the algorithmic transformation associated with a vertex in the data plot is logarithmic, the method includes identifying a logarithmic transformation for applying to the corresponding vertex in the bitmap. In other embodiments, when the algorithmic transformation associated with a vertex in the data plot is biexponential, the method includes identifying a transformation for applying to the corresponding vertex in the bitmap that includes a symmetric logarithmic transformation, a linear transformation or a combination thereof. In one example, where the algorithmic transformation associated with a vertex in the data plot is positive linear/positive linear, the method includes identifying an algorithmic transformation for applying to the corresponding vertex in the bitmap that is positive linear/positive linear. In another example, where the algorithmic transformation associated with a vertex in the data plot is positive logarithmic/positive logarithmic, the method includes identifying an algorithmic transformation for applying to the corresponding vertex in the bitmap that is positive linear/positive linear. In another example, where the algorithmic transformation associated with a vertex in the data plot is positive linear/positive logarithmic, the method includes identifying an algorithmic transformation for applying to the corresponding vertex in the bitmap that is positive linear/positive logarithmic. In another example, where the algorithmic transformation associated with a vertex in the data plot is positive logarithmic/positive linear, the method includes identifying an algorithmic transformation for applying to the corresponding vertex in the bitmap that is positive logarithmic/positive linear. In another example, where the algorithmic transformation associated with a vertex in the data plot is negative logarithmic/positive linear, the method includes identifying an algorithmic transformation for applying to the corresponding vertex in the bitmap that is negative logarithmic/positive linear. In another example, where the algorithmic transformation associated with a vertex in the data plot is positive logarithmic/negative linear, the method includes identifying an algorithmic transformation for applying to the corresponding vertex in the bitmap that is positive logarithmic/negative linear. In another example, where the algorithmic transformation associated with a vertex in the data plot is negative linear/positive logarithmic, the method includes identifying an algorithmic transformation for applying to the corresponding vertex in the bitmap that is negative linear/positive logarithmic. In another example, where the algorithmic transformation associated with a vertex in the data plot is positive linear/negative logarithmic, the method includes identifying an algorithmic transformation for applying to the corresponding vertex in the bitmap that is positive linear/negative logarithmic. In another example, where the algorithmic transformation associated with a vertex in the data plot is negative linear/negative linear, the method includes identifying an algorithmic transformation for applying to the corresponding vertex in the bitmap that is negative linear/negative linear. In another example, where the algorithmic transformation associated with a vertex in the data plot is negative logarithmic/negative logarithmic, the method includes identifying an algorithmic transformation for applying to the corresponding vertex in the bitmap that is negative linear/negative linear.

In some embodiments, methods include aligning the algorithmic transformations applied to the bitmap. In these embodiments, the transformations are aligned so that overlap is minimized and that the transform switches appropriately. In certain embodiments, methods include performing an affine transformation of the bitmaps, adjust the affine transformation so that the use of the bitmaps is maximized, i.e. the bitmap boundaries align with the region bounding box. In these embodiments, if the span across a bitmap in ADC channels is less than the bitmap resolution, a switch of the transformation to linear for that section may be performed to maximize fidelity. The bitmap may be rendered by interpolating one or more line segments between two vertices. In some instances, the bitmap may be generated with a polygon drawing algorithm, such as a polygon scanline fill algorithm.

In certain embodiments, a bitmap is generated from a data plot according to the following:

Input
- A set of vertices representing a classification region, defined in the measurement space of the instrument (after fluorescence compensation or any other processing)
- The transformations applied to the vertices when the classification region was drawn (e.g. if the vertices were drawn on a log-log plot this would be a logarithmic transformation)

Output
- A bitmap (that may be subdivided into bitmap tiles for transmission to the instrument)
- Selected hardware transformations to be applied to each bitmap tile 1. Calculate the bounding box of the input vertices. This is the min and max of all vertices for each axis.
2. Examine the source transformation for each axis of the classification region.
   If the axis transformation is linear, then select a linear hardware transformation.
   If the axis transformation is logarithmic, then select a logarithmic hardware transformation.
   If the axis transformation is biexponential (or a similar transform), select symmetric log for negative region, linear for a patch around 0, and symmetric log for positive region. Align the transformations so that overlap is minimized and that the transform switches appropriately.
3. Affine transformations of the bitmaps: adjust the affine transformation so that the use of the bitmaps is maximized, i.e. the bitmap boundaries align with the region bounding box.
   If the span across a bitmap in ADC channels is less than the bitmap resolution, optionally switch the transformation to linear for that section to maximize fidelity.
4. Transform the vertices using the source transformations for each axis.
   Produce a set of line segment vertices by pairing each adjacent pair of vertices and wrapping around so that the last and first vertices also produce a line segment.
   For each line segment, interpolate the line segment by sub-dividing into many line segment vertex pairs.
   The interpolation algorithm may be a simple linear subdivision, or may take into account the steps in the target hardware space on the axis.
5. Transform the interpolated set of vertices back into measurement space using the inverse source transformation for each axis.
6. Transform this set of vertices using the selected hardware transformation for each axis.
7. Allocate an empty bitmap that spans the hardware transform space for each axis (or a series of tiles)
8. Render the set of vertices into the bitmap using a drawing algorithm (e.g. polygon scanline fill).
   When each pixel is rendered, calculate which bitmap tile the pixel is within and set a flag to indicate a write to that bitmap tile.
9. For each bitmap tile that was written into, mark the bitmap tile as necessary. Pair the tile with its affine transformation and hardware axis transformations and store as a hardware ROI bitmap to use.
10. Group the active tiles together and assign OR logic to each set of ROI bitmaps.

If there are sufficient unused hardware ROI bitmap resources, adjust the hardware transformation so that multiple bitmaps may sub-tile a section of the transform and re-run the algorithm. This increases fidelity.

If there are insufficient hardware ROI bitmap resources, the following strategies may be used:

If the center bitmap tile in a biexponential-biexponential transformed region is completely set, consider adjusting the range of the surrounding bitmaps (e.g. the lin/log combination bitmaps) so that they encompass zero.

If the bitmap encompasses substantial amounts of negative and positive space on an axis, the linear bitmap patch may be eliminated and a positive and negative logarithmic transformation may be used.

Alternatively, a single bitmap with a symmetric logarithmic transformation to encompass both positive and negative space may be used, and in-fill with additional bitmaps for the linear dominant regions ('donut hole')

As summarized above, methods of the present disclosure according to certain embodiments also include sorting particles of the sample, such as cells of a biological sample. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample. In embodiments, methods including sorting cells by gating based on the generated bitmap (or bitmap tiles).

In sorting the cell, methods include data acquisition, analysis and recording, such as with a computer, where multiple data channels record data from each detector used in generating the data plot and bitmap. In these embodiments, analysis includes classifying and counting particles such that each particle is present as a set of digitized parameter values. The subject systems (described below) may be set to trigger on a selected parameter in order to distinguish the particles of interest from background and noise.

A particular subpopulation of interest may then further analyzed by "gating" the bitmap based on the data collected for the entire population. This procedure may be performed by plotting and generating bitmaps for forward light scatter (FSC) vs. side (i.e., orthogonal) light scatter (SSC). Where desired, the above analysis may be configured to yield counts of the particles of interest in the sample.

In some embodiments, methods for sorting components of sample include sorting particles (e.g., cells in a biological sample) with particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

In some embodiments, methods include generating a sort decision for a particle population based on the generated bitmap. In some embodiments, generating a sort decision includes generating a sort configuration that includes a truth table, one or more logical OR gates, a hierarchy of logical OR gates or a combination thereof.

In certain embodiments, methods include generating a sort decision by sorting particles of the sample with a truth table classification. In other embodiments, methods include generating a sort decision by sorting particles of a sample with a series of OR gates. In still other embodiments, methods include generating a sort decision by sorting particles of a sample with a series of OR gates followed by classification using a truth table. In certain embodiments, an arbitrary number of bitmaps are combined using OR gate stages, and methods include setting a mask word of the bitmaps used for each region. In these embodiments, methods include performing a logical OR together of specific combination of bitmap classifications and outputting the result to each subsequent gating logic. In one example, 64 bitmaps may be used, 64 different OR masks may be employed, each being of 64 bits. In another example, 32 bitmaps may be used, 32 different OR masks may be employed, each being of 32 bits. In yet another example, 64 bitmaps may be split into an upper and lower bank. In this example, the lower bank are OR combinations of the first 32 bitmaps, and the upper bank are OR combinations of the last 32 bitmaps.

Figure 7:
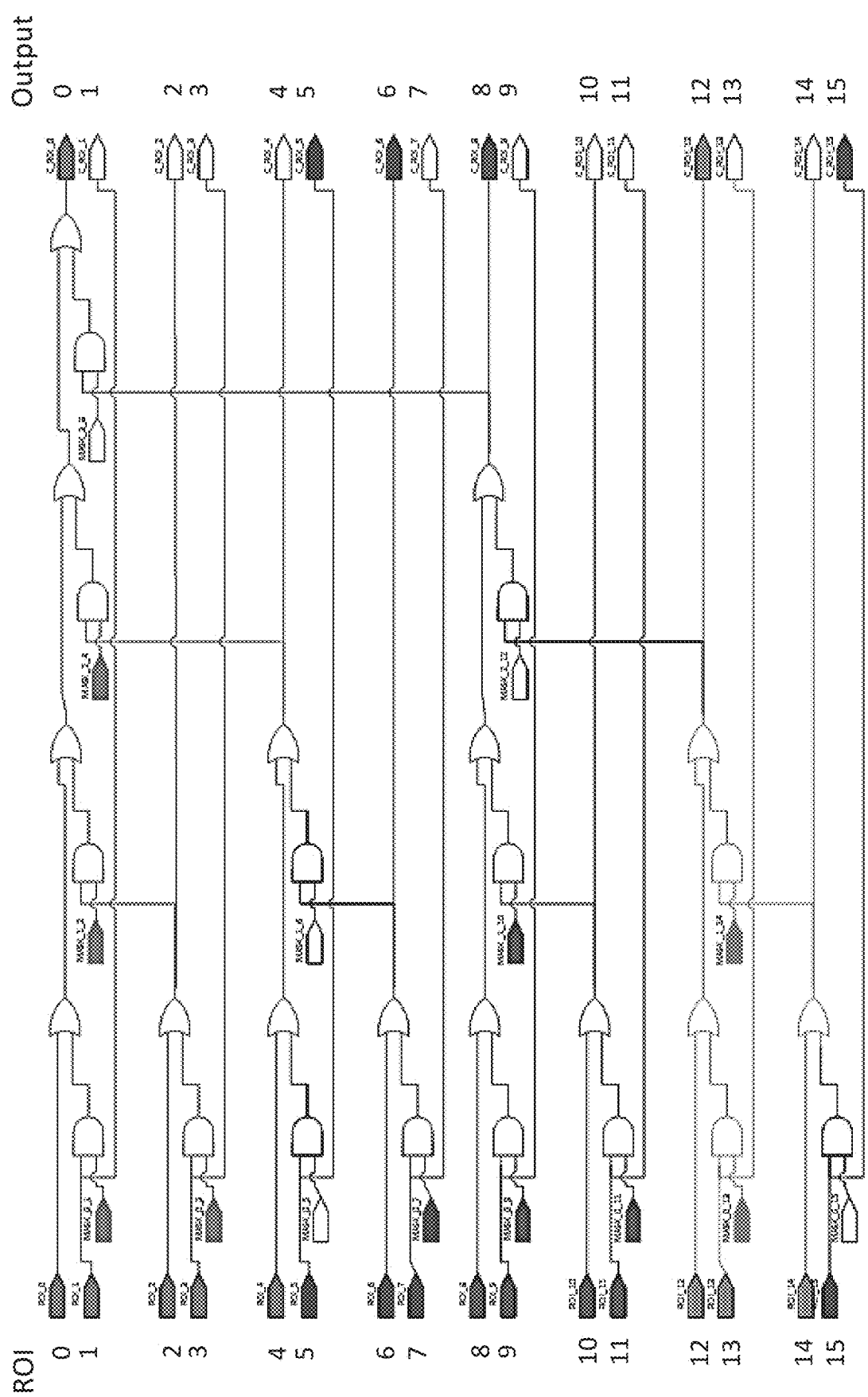
FIG. 7 depicts a nesting series of AND and OR gates for generating a sorting decision according to certain embodiments.

In certain embodiments, methods include employing a nested series of AND and OR gates. FIG. 7 depicts a nesting series of AND and OR gates for generating a sorting decision according to certain embodiments. In FIG. 7, on the left hand side are the outputs of the hardware ROI bitmap classifiers. Every odd numbered input passes into an AND gate as well as straight through to the output. The other input of the AND gate comes from a control register. If the control register bit is set for the AND gate, then the input value passes through to an OR gate where it is combined with its pair even numbered input. This enables the OR function. If the control register bit is not set for the AND gate, then the output of the AND gate is zero and the OR gate takes the even numbered input and the zero, which is equivalent to passing through the value of the even numbered input.

With reference to FIG. 7, in one example, regions that include 5, 4, 3, 2, and 1 bitmaps are assigned to hardware region of interest (ROI) bitmaps. The first five ROI bitmaps are used for the 5 bitmap region. Bitmaps 0 and 1 are combined, 2 and 3 are combined, and then their outputs are combined. Bitmap 5 passes through two stages of OR gates before being combined with the combination of 0, 1, 2 and 3. This is the passed through the last OR gate to arrive at output 0. The outputs 1, 2, 3 and 4 represent various intermediate products. Bitmap 5 is used for one of the single bitmap regions. Because the paths from bitmap 5 were used for the 5 bitmap region, this bitmap slot may only be used for a single bitmap region. The input passes straight through to the output. Bitmaps 6 and 7 are combined to represent a dual bitmap region. The output of the OR gate passes through to output 6. Bitmaps 8 through 11 are combined to represent a quad bitmap region. Two cascading OR stages combine 8 and 9, 10 and 11, and then their result. The result passes through one OR gate and then through to output 8. Bitmaps 12, 13 and 14 are used to represent a triple bitmap region. Bitmaps 12 and 13 are combined with an OR gate, bitmap 14 passes through an OR gate and then is combined with 12 and 13. Bitmap 15 passes straight through to output 15.

In some embodiments, this is repeated hierarchically with the odd numbered outputs passing through and to an OR gate, and the even numbered outputs passing into an OR gate. This allows with a small number of layers to be able to OR together any number of combinations of ROI bitmap classifiers. In certain instances, a packing algorithm may be used to configure the regions. In some embodiments, the bitmaps for each region are assigned to hardware ROI bitmaps. If the OR logic cannot OR arbitrary hardware ROI bitmaps, but only in a specific hierarchy, a packing algorithm may be used to assign the bitmaps to the hardware ROI bitmaps. In some embodiments, methods include employing a recursive packing algorithm. In this embodiment, the input into the algorithm include: 1) a list of pairs that include bin position and capacity; 2) a list of regions that include the number of bitmaps required per region.

For each bin in the list of bins, methods according to certain embodiment include:

querying the list of regions for the region with the largest number of bitmaps that fits within the current bin capacity.

where there is is a region with the largest number of bitmaps that fits within the current bin capacity, methods according to certain instances include:

outputting the region with the current bin position as its location;

removing the region from the list of regions to process;

calculating the number of unused ROI bitmaps within the bin (e.g., the bin capacity minus the number of ROI bitmaps in the selected region);

splitting the remaining ROI bitmaps within the bin into new bins based on the power of 2 components of the remainder.

In certain embodiments, where 3 ROI bitmaps are left over, the bitmaps are split into bins of size 1 and 2. In these embodiments, the bins are positioned in ascending order of size and the position begins from the current bin position plus the number of bitmaps used by the current region.

In certain instances, the algorithm is recursively called with the new list of bins and the remaining regions.

In some instances where there are regions remaining in the list after completing the algorithm, methods may include:

finding unused ROI bitmap slots within the output list;

assigning the bitmaps within a region to non-contiguous hardware ROI bitmaps; and building a truth table for the gating stage that ORs the non-contiguous regions. For example, if a region includes 9 bitmaps, methods may include splitting the region into two distinct regions requiring 8 bitmaps and 1 bitmap. In these embodiments, the single bitmap will tile into a spare slot if one exists and a truth table can be constructed that ORs the 8 bitmaps and 1 bitmap.

In other instances where there are regions remaining in the list after completing the algorithm, methods may include:

using a heuristic to determine which regions can be represented with fewer bitmaps. For example, where the aspect ratio of the pixels is maintained to allocate to the bitmaps for a largely rectangular region, two bitmaps may be allocated. In other instances, a single bitmap may be used with pixels stretched across ADC channels more in one direction.

Systems for Sorting Particles of a Sample

As summarized above, aspects of the present disclosure include systems for generating a bitmap from a data plot of measured light from particles in a flow stream. Systems according to certain embodiments include a light source configured to irradiate particles in a flow stream, a light detection system having one or more photodetectors and a processor comprising memory operably coupled to the processor wherein the memory includes instructions stored thereon, which when executed by the processor, cause the processor to: generate a data plot of measurements of the detected light, such that the data plot includes one or more regions each having a population of particles; calculate a set of vertices that form a boundary for each region in the data plot; identify a type of algorithmic transformation associated with each vertex in the set of vertices; and generate a bitmap of each region of particles, such that the bitmap of each region includes a set of vertices that correspond to the vertices of each region in the data plot; and identify an algorithmic transformation for applying to each vertex in the bitmap of each region. In embodiments, the algorithmic transformation applied to each vertex in the bitmap is the same type of algorithmic transformation associated with each corresponding vertex in the data plot.

Systems of interest include a light source configured to irradiate a sample having cells in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more photodetectors for detecting and measuring light from the sample. Photodetectors of interest may be configured to measure light absorption (e.g., for brightfield light data), light scatter (e.g., forward or side scatter light data), light emission (e.g., fluorescence light data) from the sample or a combination thereof. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, systems include a processor with memory operably coupled to the processor such that the memory includes instructions stored thereon, which when executed by the processor, cause the processor to generate a data plot having measurements of the detected light where the data plot includes one or more regions each having a population of particles. The processor may be configured to generate the data plot from detected light absorption, detected light scatter, detected light emission or any combination thereof. In some instances, the systems are configured to generate the data plot from light absorption detected from the sample, such as from a brightfield light detector. In these instances, the data plot is generated based on brightfield image data from the cell in the flow stream. In other instances, the data plot is generated from light scatter detected from the sample, such as from a side scatter detector, a forward scatter detector or a combination of a side scatter detector and forward scatter detector. In yet other instances, the data plot is generated from emitted light from the sample, such as light from fluorophores added to the sample. In still other instances, the data plot is generated from a combination of detected light absorption, detected light scatter and detected light emission.

Systems of interest are configured to generate a data plot that include one or more regions plotting a population of particles, such as two or more regions, such as three or more regions, such as four or more regions and including five or more regions. In some embodiments, systems include a processor with memory operably coupled to the processor such that the memory includes instructions stored thereon, which when executed by the processor, cause the processor to determine the boundaries of each region in the data plot. In some instances, to determine the boundary of a region of the data plot, the subject systems are configured to calculate a set of vertices that form the boundary for each region in the data plot by determining the minimum value and maximum value along each axis of the data plot for each vertex. In these embodiments, the minimum value along the x-axis and the minimum value along the y-axis as well as the maximum value along the x-axis and the maximum value along the y-axis are determined by the system for each vertex.

In embodiments, an algorithmic transformation that is associated with the vertices of each region of the data plot is determined. Depending on the type of data plot employed (e.g., a biexponential data plot), the algorithmic transformation identified for each vertex of the data plot may vary, such as being a linear numerical transformation, a logarithmic numerical transformation or a biexponential numerical transformation. The transformation may be positive or negative depending on the particle population position on the data plot. For example, the transformation may be a positive linear, positive logarithmic, negative linear or negative logarithmic transformation.

A bitmap is generated for each particle population region in the data plot. Systems according to certain embodiments include a processor with memory operably coupled to the processor such that the memory includes instructions stored thereon, which when executed by the processor, cause the processor to generate bitmaps that are formed from a one or more tiles. In some embodiments, two or more bitmap tiles are generated from the data plot, such as 3 or more bitmap tiles, such as 4 or more bitmap tiles, such as 5 or more bitmap tiles, such as 6 or more bitmap tiles, such as 7 or more bitmap tiles, such as 8 or more bitmap tiles and including 9 or more bitmap tiles. Each bitmap tile may include one or more vertices of the boundaries from each region of the particle population of interest, such as 2 or more vertices, such as 3 or more vertices, such as 4 or more vertices and including 5 or more vertices of each region of the particle population of interest.

In embodiments, systems are configured for identifying an algorithmic transformation for applying to each vertex in the bitmap. Depending on the type of data plot employed (e.g., a biexponential data plot), the algorithmic transformation identified for each vertex of the bitmap may vary, such as being a linear numerical transformation, a logarithmic numerical transformation or a biexponential numerical transformation. The transformation may be positive or negative depending on the particle population position on the data plot. In some embodiments, when the algorithmic transformation associated with a vertex in the data plot is linear, systems are configured to identify a linear transformation for applying to the corresponding vertex in the bitmap. In other embodiments, when the algorithmic transformation associated with a vertex in the data plot is logarithmic, systems are configured to identify a logarithmic transformation for applying to the corresponding vertex in the bitmap. In other embodiments, when the algorithmic transformation associated with a vertex in the data plot is biexponential, systems are configured to identify a transformation for applying to the corresponding vertex in the bitmap that includes a symmetric logarithmic transformation, a linear transformation or a combination thereof. In one example, where the algorithmic transformation associated with a vertex in the data plot is positive linear/positive linear, systems are configured to identify an algorithmic transformation for applying to the corresponding vertex in the bitmap that is positive linear/positive linear. In another example, where the algorithmic transformation associated with a vertex in the data plot is positive logarithmic/positive logarithmic, systems are configured to identify an algorithmic transformation for applying to the corresponding vertex in the bitmap that is positive linear/positive linear. In another example, where the algorithmic transformation associated with a vertex in the data plot is positive linear/positive logarithmic, systems are configured to identify an algorithmic transformation for applying to the corresponding vertex in the bitmap that is positive linear/positive logarithmic. In another example, where the algorithmic transformation associated with a vertex in the data plot is positive logarithmic/positive linear, systems are configured to identify an algorithmic transformation for applying to the corresponding vertex in the bitmap that is positive logarithmic/positive linear. In another example, where the algorithmic transformation associated with a vertex in the data plot is negative logarithmic/positive linear, systems are configured to identify an algorithmic transformation for applying to the corresponding vertex in the bitmap that is negative logarithmic/positive linear. In another example, where the algorithmic transformation associated with a vertex in the data plot is positive logarithmic/negative linear, systems are configured to identify an algorithmic transformation for applying to the corresponding vertex in the bitmap that is positive logarithmic/negative linear. In another example, where the algorithmic transformation associated with a vertex in the data plot is negative linear/positive logarithmic, systems are configured to identify an algorithmic transformation for applying to the corresponding vertex in the bitmap that is negative linear/positive logarithmic. In another example, where the algorithmic transformation associated with a vertex in the data plot is positive linear/negative logarithmic, systems are configured to identify an algorithmic transformation for applying to the corresponding vertex in the bitmap that is positive linear/negative logarithmic. In another example, where the algorithmic transformation associated with a vertex in the data plot is negative linear/negative linear, systems are configured to identify an algorithmic transformation for applying to the corresponding vertex in the bitmap that is negative linear/negative linear. In another example, where the algorithmic transformation associated with a vertex in the data plot is negative logarithmic/negative logarithmic, systems are configured to identify an algorithmic transformation for applying to the corresponding vertex in the bitmap that is negative linear/negative linear.

In some embodiments, systems are configured to align the algorithmic transformations applied to the bitmap. In these embodiments, the transformations are aligned so that overlap is minimized and that the transform switches appropriately. In certain embodiments, systems are configured to perform an affine transformation of the bitmaps, adjust the affine transformation so that the use of the bitmaps is maximized, i.e. the bitmap boundaries align with the region bounding box. IThe bitmap may be rendered by interpolating one or more line segments between two vertices. In some instances, the bitmap may be generated with a polygon drawing algorithm, such as a polygon scanline fill algorithm.

In some embodiments, the subject systems are configured to sort components of a sample, such as cells in a biological sample. As described above, sorting is referred to herein in its conventional sense as separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components.

One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, the subject systems include a particle sorting component for sorting cells of the sample. In certain instances, the particle sorting component is a particle sorting module such as those described in U.S. Patent Publication No. 2017/0299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

In some embodiments, the subject systems are flow cytometric systems employing the above described weighted least squares algorithm for analyzing and sorting particles in a sample (e.g., cells in a biological sample). Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol,* 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

A common flow sorting technique utilizes drop sorting in which a fluid stream containing linearly segregated particles is broken into drops and the drops containing particles of interest are electrically charged and deflected into a collection tube by passage through an electric field. Current drop sorting systems are capable of forming drops at a rate of 100,000 drops/second in a fluid stream that is passed through a nozzle having a diameter less than 100 micrometers. Drop sorting requires that the drops break off from the stream at a fixed distance from the nozzle tip. The distance is normally on the order of a few millimeters from the nozzle tip and can be maintained for an unperturbed fluid stream by oscillating the nozzle tip at a predefined frequency.

Typically, the linearly segregated particles in the stream are characterized as they pass through an observation point situated just below the nozzle tip. Once a particle is identified as meeting one or more desired criteria, the time at which it will reach the drop break-off point and break from the stream in a drop can be predicted. Ideally, a brief charge is applied to the fluid stream just before the drop containing the selected particle breaks from the stream and then grounded immediately after the drop breaks off. The drop to be sorted maintains an electrical charge as it breaks off from the fluid stream, and all other drops are left uncharged. The charged drop is deflected sideways from the downward trajectory of the other drops by an electrical field and collected in a sample tube. The uncharged drops fall directly into a drain.

In addition to or as an alternative to sorting particles, data about the particles may be collected. Data collected by particle analyzers such as flow cytometers may generate data vales that are negative due to, for example, fluorescence compensation or baseline restoration. These may not be represented by a normal logarithm. To maintain the integrity of the data set, such value may be clamped to a minimum positive value (e.g., 26.2 on a BD FACSMelody™). Recently, a number of transformations have been employed in multi-parametric biological event data analytics that include negative values. These transformations can have similar characteristics to the logarithmic transformation but also resemble a linear transformation for measurements around zero. Examples of such transformations include biexponential (logicle), arcsinh, and hyperlog transformations.

One problem with implementing these functions in sorting electronics is that the functions may not be invertible. To address this shortcoming, some systems include a look-up table or a function approximation to facilitate the transformations. The transformations relying on such tables or approximations may still require electronics and other processing resources that hinder efficient inclusion in the sorting electronics, particularly for transformations that may be parameterized differently for each measured value of the particle. For example, a Taylor series expansion may be time and resource expensive, requiring many multiply accumulate type operations, while look-up table or memory resources may be constrained, or external memory may be too contended with multiple parameters requiring transformation simultaneously in a data processing pipeline.

The BD FACSChorus™ on the FACSMelody™ cell sorter attempts to partially solve this problem by transforming regions drawn on biexponential transformed axes into regions drawn on logarithmic transformed axes. It interpolates the edges of the regions between vertices and then renders the region in logarithmic transformed space. This, however, does not solve the issue with data below the logarithmic floor (e.g., 26.2) and subsequently any event where the measured value is below the floor will be treated as if it was the floor despite having a different measured value. This means that identifying where an event should be displayed in regions that cross the axes may not be determined based on the transformed data. For example a region drawn wholly below an axis may sort all data on the axes within the range of the additional parameter.

Described herein are features which include interpolation between transformation methods to render a polygon representing a group of events of particular interest into multiple bitmap patches. These patches can independently switch transformations depending on how well the transformation matches the source vertices at that point. The populations of interest may be identified prior to the experiment (e.g., defining sorting populations) or after the experiment (e.g., graphic analysis of event data for a population).

As used herein, "system," "instrument," "apparatus," and "device" generally encompass both the hardware (e.g., mechanical and electronic) and, in some implementations, associated software (e.g., specialized computer programs for graphics control) components.

As used herein, an "event" generally refers to the data measured from a single particle, such as cells or synthetic particles. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. In some biological applications, event data may correspond to quantitative biological data indicating expression of a particular protein or gene.

As used herein, a "population", or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters.

As used herein, a "gate" generally refers to a boundary identifying a subset of data (e.g., particle measurements) of interest. In cytometry, a gate may bound a group of events of particular interest. The group of events may be referred to a population. Further, as used herein, "gating" may generally refer to the process of defining a gate for a given set of data such as via a user interface or plate and well selections.

FIG. 1 is a schematic drawing of a cell sorter system 100, in accordance with one embodiment presented herein. As shown in FIG. 1, a drop formation transducer (e.g., piezo-oscillator) 102 is coupled to a fluid conduit, such as nozzle 101. Within nozzle 101, sheath fluid 104 hydrodynamically focuses a sample fluid 106 into a stream 108. Within stream 108, particles (e.g., cells) are lined up in single file to cross a laser-stream intersect 110 (e.g., the LJI), irradiated by an irradiation source (e.g., laser) 112. Vibration of piezo-oscillator 102 causes stream 108 to break into a plurality of drops 109.

In operation, an event detector 114 identifies when a particle of interest (or cell of interest) crosses laser-stream intersect 110. Event detector 114 feeds into timing circuit 128, which in turn feeds into flash charge circuit 130. At the drop break off point, informed by a timed drop delay (at), a flash charge is applied to the stream such that the drop of interest carries a charge. The charged drop can then be sorted by activating deflection plates (not shown) to deflect the drop into a collection tube or a multi-well sample plate where a well may be associated with drops of particular interest. As shown in FIG. 1, however, the drops are collected in a drain receptacle 138.

Drop boundary detector 116 serves to automatically determine the phase of the drop drive signal when a particle of interest passes the laser-stream intersect 110. An exemplary drop boundary detector is described in U.S. Pat. No. 7,679, 039, which is incorporated herein by reference in its entirety. Drop boundary detector 116 allows the instrument to accurately calculate the place of each detected particle in a drop. Drop boundary detector 116 feeds into an amplitude signal 120 and phase 118 signal, which in turn feeds (via amplifier 122) into an amplitude control circuit 126 and/or frequency control circuit 124. Amplitude control circuit 126 and/or frequency control circuit 124, in turn, controls piezo-oscillator 102.

Cell sorter system 100 further includes a current-to-voltage converter (CVC) 134 coupled to the drain receptacle 138. CVC 134 is configured to detect the presence of a charged particle entering the drain receptacle 138. Resistor 136 sets the volts-per-amp of CVC 134, and provides a voltage that is proportional to current observed at the drain receptacle 138. Drain current is measured in circuit unit 132 and is provided to a processor 140. Processor 140 then feeds into frequency control circuit 124.

In some implementations, sort electronics (e.g., the drop boundary detector 116, the event detector 114, the processor 140) may be coupled with a memory configured to store the detected events and a sort decision based thereon. This information may be included in the event data for a particle. However, as discussed herein, the sorting decision generated by the sort electronics may be different than a sort identified by a workstation based on gates defined for an experiment. As the analysis of event data can be performed on a workstation, this may cause a disconnect between the cell sort information generated by the workstation and the actual sorting for a plate.

In flow cytometry sorting, the use of index-sorting implies additional information is available that links the individual cell events to their destination locations in a plate or slide holder. This information may be used post-acquisition to do additional analysis of where cells are physically located on a plate device. It also allows users to see where those cells are located on bi-variate plots. Current index sort products offer very limited interaction with the data during the analysis phase.

Index sorting is cell sorting where the sorting device may record the sort decision for each event (typically a cell or other particle suspended in a flow stream) and the data is available for post sort analysis. Typically index sorting is performed by detecting a property of a particle (such as color) and directing the particle into a collection plate. The plate may include several plate destinations (e.g., well locations). The soring may include directing the particle to a particular plate location (e.g., well) within the plate. The sorting device may record, in association with an identifier for the event, the destination plate and/or well location. Each sorted event thus has all the measurements from the detectors (PMTs, photodiodes) along with the well location and sort destination. A user can examine a sorted cell's data and correlate it with subsequent operations on the plate (e.g., gene expression derived from sequencing the sorted cells).

Index sorting analysis may require the display of both sorted and unsorted events with plots and statistics. The sorter may perform one or more of: fluorescence compensation, axis transformation (e.g., binomial or other nonlinear transformation), or region and gate classification on each event.

In some implementations, a target gate may be used to identify events of interest. A target gate may be provided by selecting an area on a two dimensional plot. Events that are detected with property values within the selected area for the two dimensions are considered within the target gate and may be sorted to a particular location. An event may be within the target gate but under certain sorting modes (e.g., a purity or single cell mode), the event may not be sorted correctly such as if another event is within the same drop in the fluidic stream as the event. In some implementations, this may be referred to as entrainment or cohesion.

As part of recording the sort decisions, the sort electronics of the sorting device may transmit the sort destination along with the event raw data. Event raw data may include a detected property for the event (e.g., reflected light values, fluorescence information, light scatter information, time of the event, a sequence number for the event, sorting device operational characteristics at the time the event was analyzed (e.g., temperature, flow rate, sort mode, etc.), or the like). For index sorting, the current tray, plate, microscope slide, or other physical medium with spatially separated pools where drops including cells may be deposited, coordinates of the location where a cell for a particular event was deposited may also be transmitted.

The sort electronics also transmits the region classifications the sort classification that the digital signal processor (DSP) made for each event. The region classifications may include a bit mask of the current regions sent to the sort electronics.

A region may include a bitmap on a pair of transformed parameters (e.g. CD4-A log vs CD8-A log, or FSC-A linear vs SSC-A linear). Any event where the pair of transformed parameters falls within the set bits of the bitmap is considered to be within the region.

A target gate may consists of a truth table consisting of the combinations of regions and gates such that events having parameters corresponding to the region are considered members (e.g., "within") the associated gate. Other methods of expressing membership of a gate are possible (e.g. a list of regions if the logic consists of an AND combination, use of a postfix logic expression, etc.).

Figure 2:
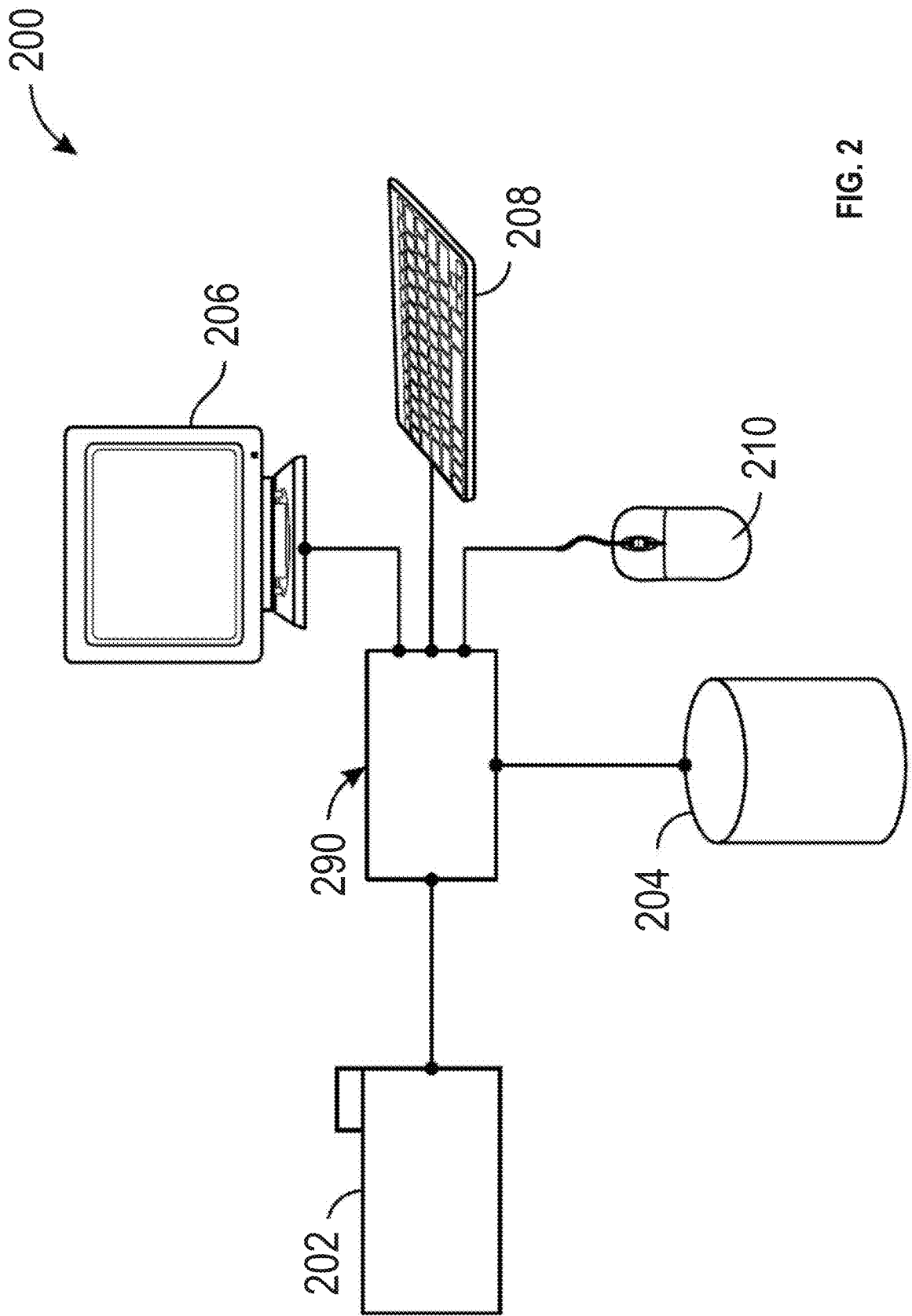
FIG. 2 shows a functional block diagram for one example of a graphics control system for that may implement one or more of the features described.

FIG. 2 shows a functional block diagram for one example of a graphics control system for that may implement one or more of the features described.

A particle analyzer 202 such as a flow cytometer may be configured to acquire quantitative data for biological events. For example, particle analyzer 202 may generate flow cytometric event data. The particle analyzer 202 may include a cell sorting system such as the cell sorter system 100 shown in FIG. 1. In such embodiments, the event data may include a sorting decision for a particle. The particle analyzer 202 may be configured to provide event data to a graphics controller 290. A data communication channel may be included between the particle analyzer 202 and the graphics controller 290. The events may be provided to the graphics controller 290 via the data communication channel.

The graphics controller 290 may be configured to receive the events from the particle analyzer 202. The events received from the particle analyzer 202 may include flow cytometric event data or other quantitative biological event data. The graphics controller 290 may be configured to provide a graphical display including a first plot or other visualization (e.g., wells) of events to a display device 206. The graphics controller 290 may be further configured to render a gate around a population of events shown by the display device 206, overlaid upon the first plot. Additionally, the graphics controller 290 may be further configured to display the events on the display device 206 within the gate differently from other events in the events outside of the gate. For example, the graphics controller 290 may be configured to render the color of flow cytometric events contained within a gate to be distinct from the color of flow cytometric events outside of the gate. The display device 206 may be implemented as a monitor, a tablet computer, a smartphone, or other electronic device configured to present graphical interfaces.

The graphics controller 290 may be connected to a storage device 204. The storage device 204 may be configured to receive and store flow cytometric events from the graphics controller 290. The storage device 204 may also be configured to receive and store flow cytometric event data from the graphics controller 290. The storage device 204 may be further configured to allow retrieval of flow cytometric events and flow cytometric event data by the graphics controller 290.

A display device 206 may be configured to receive display data from the graphics controller 290. The display data may comprise plots of flow cytometric events and gates outlining sections of the plots. The display device 206 may be further configured to alter the information presented according to input received from the graphics controller 290 in conjunction with input from the particle analyzer 202, the storage device 204, the keyboard 208, and/or a mouse 210.

The graphics controller 290 may be configured to receive a selection signals identifying activation of a control element such as a button, drawing of a gate, or keyboard input from a first input device. For example, the input device may be implemented as the mouse 210. The mouse 210 may initiate a gate selection signal to the graphics controller 290 identifying the gate to be displayed on or manipulated via the display device 206 (e.g., by clicking on or in the desired gate when the cursor is positioned there). If the visualizations include a well display, selection of particular wells may be included in the gate selection signal.

The first and second input devices may be implemented as one or more of the mouse 210, a keyboard 208, or other means for providing an input signal to the graphics controller 290 such as a touchscreen, a stylus, an optical detector, or a voice recognition system. Some input devices may include multiple inputting functions. In such implementations, the inputting functions may each be considered an input device. For example, as shown in FIG. 2, the mouse 210 may include a right mouse button and a left mouse button, each of which may generate a triggering event.

The triggering event may cause the graphics controller 290 to alter the manner in which the data is displayed or which portions of the data is actually displayed on the display device 206 or both at the same time.

In some embodiments, the graphics controller 290 may be configured to detect when gate selection is initiated by the mouse 210. The graphics controller 290 may be further configured to automatically modify one or more interface elements to respond to the selection/input as described. The alteration may include loading event data from a specified source and presenting a user interface showing event data or selections therefor.

The graphics control 290 may receive adjustments that change the way a plot is displayed. For example, the scaling applied to at least one dimension displayed on via the plot. In one example, an initial plot may render values in the x and y dimensions using a logarithmic scale. A user may activate a control element on the interface to change the scaling of the values. In some systems, the gate may not be adjusted according to the scaling values. In such instances, the populations defined by the gate in the scaled plot may not be accurate due to a change in the underlying parameter scaling. In some systems, a universal scaling may be applied to the gate. However, this too may provide inaccurate representation of the population due to the non-linearity of values in the initial plot at the time the original gate was defined.

To provide an accurate representation of a gate as the scaling of a plot is adjusted, a plot may be divided into tiles and each tile associated with a transformation to adjust the region within each tile associated with a gate.

FIG. 3 shows an initial plot using biexponential scaling. The initial plot includes a shaded area representing a gated area of interest or region of interest. This area may be used by a particle analyzer for sorting events within the gated area into a specific collection receptacle (e.g., a well on a collection plate).

Figure 4A:
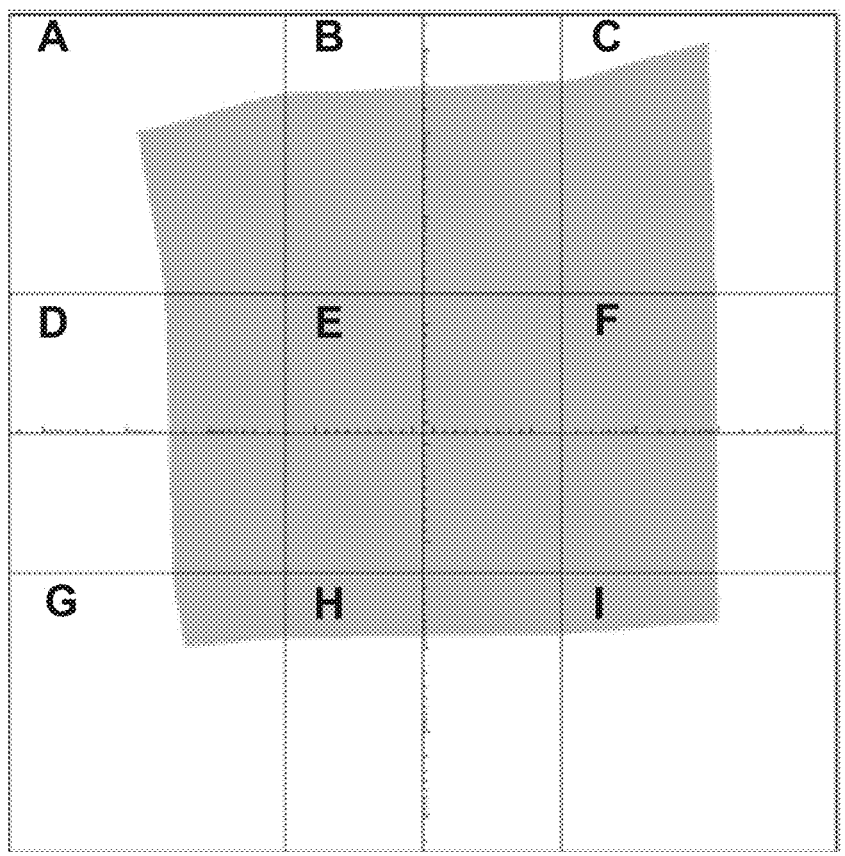
FIG. 4A shows a tiling for the initial plot shown in FIG. 3 after scaling.

FIG. 4A shows a tiling for the initial plot shown in FIG. 3 after scaling. The x and y axes have been transformed in FIG. 4A from the biexponential scale to negative log, linear, and positive log scales. As part of this transformation, the three transformations for each axis yields nine regions which are labeled A through I are defined. The gated region in FIG. 4A is represented as nine separate polygons, each with a portion falling in one of the nine regions. An affine transformation is applied to each bitmap to position it so that the corners are at the extent of the region. This allows 256 bitmap channels to be used for defining the total region of interest.

Figure 4B:
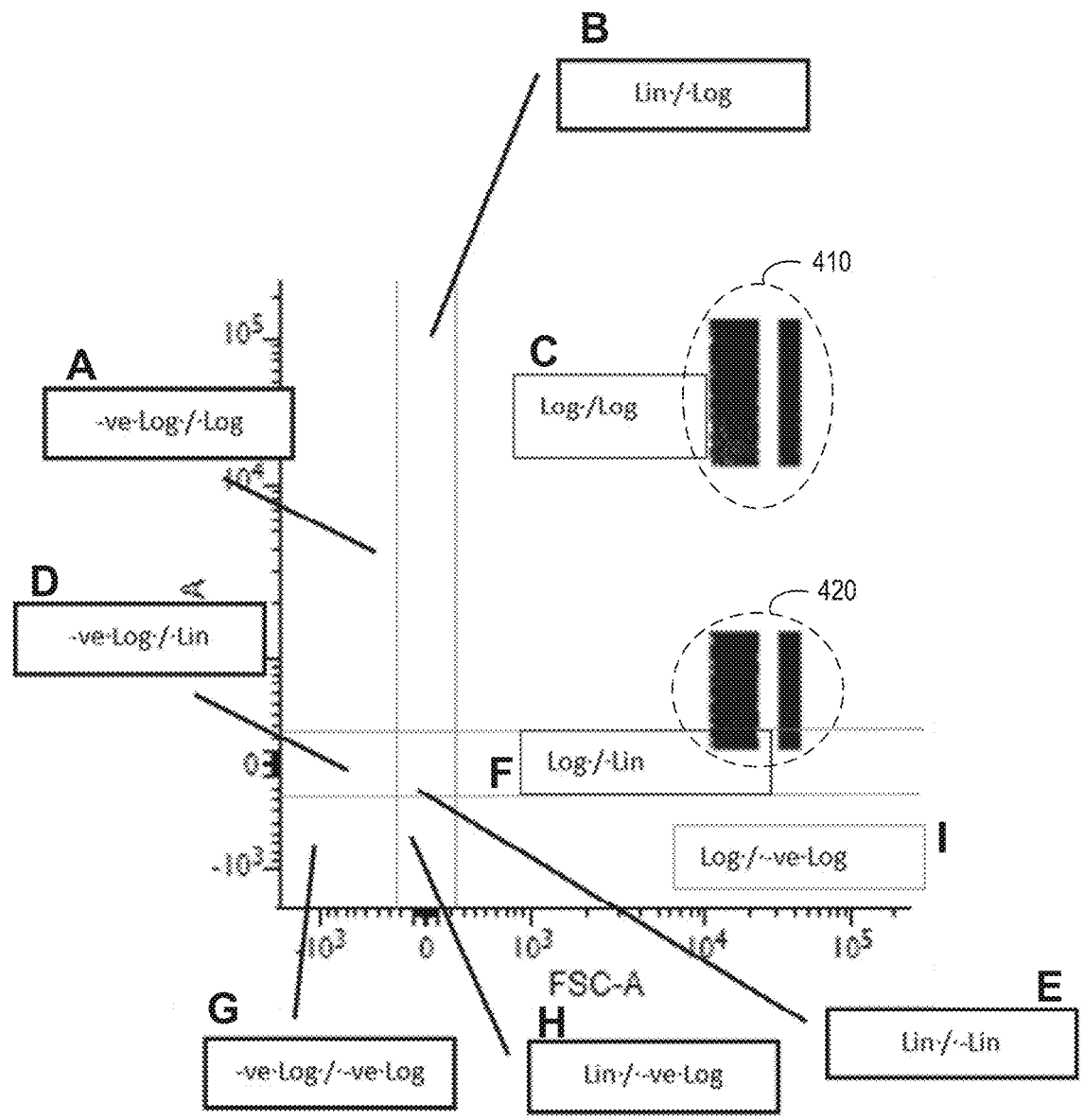
FIG. 4B shows a specific tiling for an initial plot.

FIG. 4B shows a specific tiling for an initial plot. In FIG. 4B, specific transformations are assigned to each tile to control how the values within a tile are adjusted in response to a scaling request. The plot includes two gated populations 410 and 420. Population 410 is entirely located within tile C whereas population 420 spans two tiles-tile C and tile F. For population 420, if sorting is to be performed for this population, any transformation on events in tile C may be processed differently from events in tile F.

Unlike FIG. 4A, in FIG. 4B, the tiles are not uniformly shaped when displayed. The tiles themselves are uniform in the hardware sort bitmaps, but the range of source plot space they map is not as shown in FIG. 4B. In FIG. 4A the tiles are 256×256. There are 9 tiles in FIG. 4A which can be combined to form a bitmap of 768×768. In FIG. 4B, the area of the source plot from whence the respective tiles are sourced is shown. The set of tiles may be dynamically generated using a method similar to that described with reference to FIG. 5.

Figure 5:
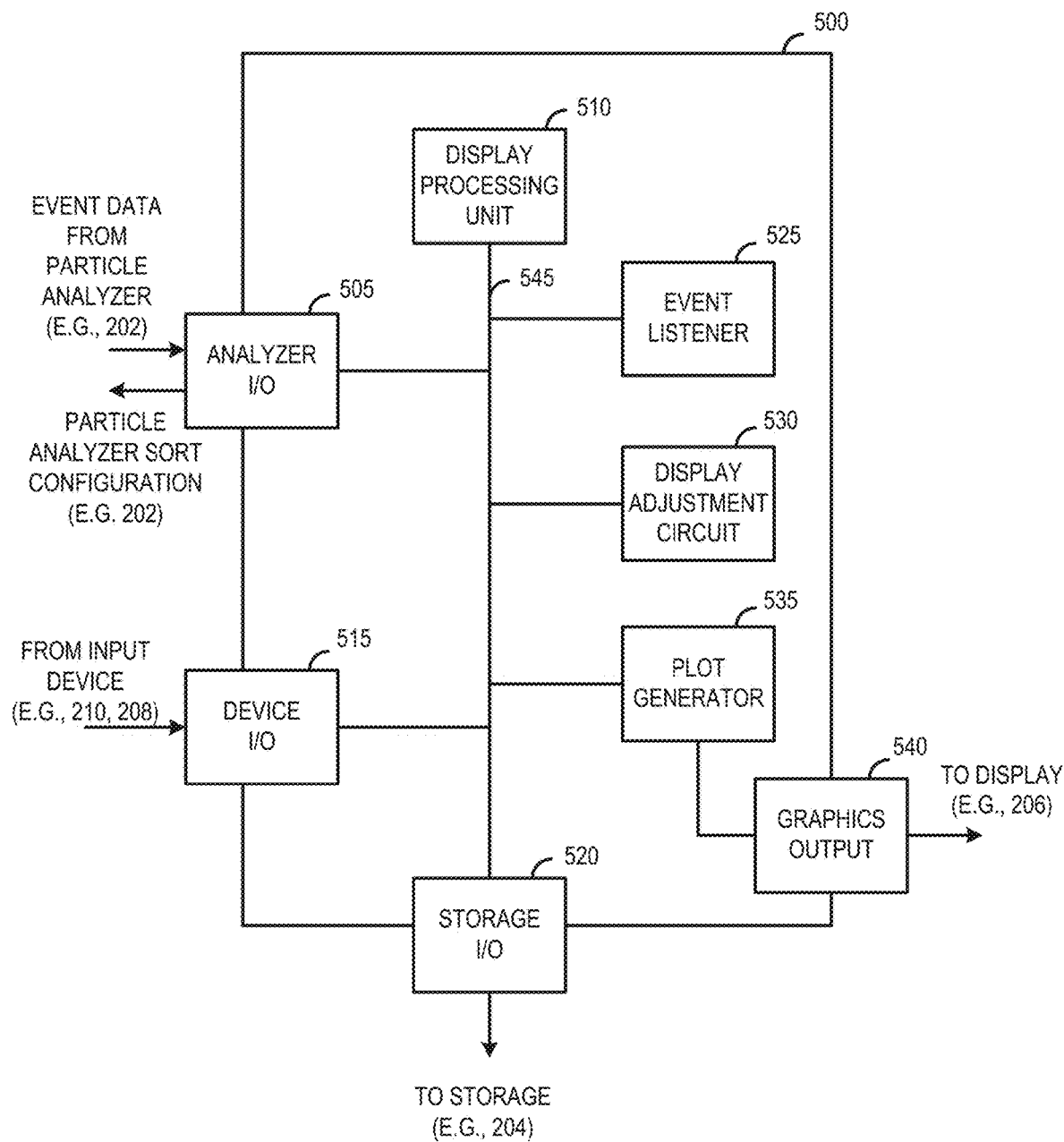
FIG. 5 shows a functional block diagram for one example of a graphics control system for that may implement one or more of the features described.

FIG. 5 shows a functional block diagram for one example of a graphics control system for that may implement one or more of the features described. The graphics controller 500 shown in FIG. 5 may be included in the system 200 shown in FIG. 2. The graphics controller 500 may be implemented as a specially configured device for accurately scaling non-linear gates to other linear or non-linear formats. In some implementations, the graphics controller 500 may be integrated with the particle analyzer 202, the display device 206 (e.g., tablet computer, laptop computer, desktop computer), or other electronic hardware.

The graphics controller 500 includes an analyzer input/output (I/O) interface 505. The analyzer input/output interface 505 may be configured to provide sorting configuration information to the particle analyzer. For example, a user may define a gate representing particles of interest. The graphics controller 500 may convert the gate into a configuration that can be applied by the particle analyzer to sort a sample according to the graphically defined gate. The configuration may be a truth table or a hierarchy of logical OR gates.

The analyzer input/output interface 505 may also be configured to receive event data from a particle analyzer, such as a flow cytometer. The analyzer I/O interface 505 may be a hardware interface providing a path for the event data to be received by the graphics controller 500. For example, the analyzer input/output interface 505 may be implemented as a network interface, a Universal Serial Bus interface, a serial data communication interface, memory access device, or other machine-to-machine communication interface. The data may be received in a standardized, machine readable format such as a comma separated list, a token separated list, mark-up language document, or a spreadsheet.

The particle event data received by the graphics controller 500 via the analyzer input/output interface 505 may be stored in a storage device such as the storage device 204 shown in FIG. 2. The graphics controller 500 may include a storage input/output (I/O) interface 520 to facilitate storage and retrieval of data to and from a storage device. For example, the storage I/O interface 520 may be implemented as a network interface, a Universal Serial Bus interface, a serial data communication interface, memory access device, or other machine-to-machine communication interface. In some implementations, the storage I/O interface 520 may be configured to generate queries to retrieve information requested by an element of the graphics controller 500. Such queries may be in a standardized query language such as Structured Query Language (SQL). In some implementations, the storage I/O interface 520 may be configured to generate storage commands to persist data in the storage device. SQL update or insert commands are examples of storage commands generated by the storage I/O interface 520.

A display processing unit 510 is shown in FIG. 5. The display processing unit 510 coordinates the activities of the graphics controller 500. For example, the display processing unit 510 may receive a signal that data has been received via the analyzer I/O interface 505. Upon detecting the signal, the display processing unit 510 may transmit an instruction to route the data to the storage I/O interface 520 for storage. The display processing unit 510 may coordinate the activities according to a preconfigured set of machine readable instructions.

The graphics controller 500 shown in FIG. 5 also includes a device input/output (I/O) interface 515. The device I/O interface 515 receives signals from input devices such as a mouse or keyboard. The display processing unit 510 may detect an input signal, such as a scaling signal, and adjust a display according to one or more of the described aspects. One input signal may include a message to begin displaying event data. The input signal may include an identifier for the experiment for which data should be displayed. Using this identifier, the event data may be retrieved such as via the storage I/O interface 520 or from the particle analyzer via the analyzer I/O interface 505.

An event listener 525 may be included in the graphics controller 500 to monitor the signals received via the device I/O interface 515. The event listener 525 may be configured such that signals from input devices may be translated into graphics adjustments. The graphics controller 500 may include multiple event listeners 525 to account for different system contexts. For example, a key press before any event data is displayed may be used to trigger loading of data. However, once data is initially displayed, the same key press event may cause a different system response, such as application of a specific transformation.

The event listener 525 may include a registry of events and corresponding graphics control functions (e.g., transformations) to trigger upon detection of the event. For example, the event listener 525 may be configured to detect a keystroke (e.g., control key pressed with the "L" key and the "H" key). The event listener 525 may be contextually aware. For example, the keystroke may trigger the graphics control function when detected in conjunction with another input signal (e.g., mouse selection, mouse location), system state (e.g., power on, plugged-in), data state (e.g., cytometry data loaded), display state (e.g., plot displayed, type of plot currently displayed), or the like. The registry may be persisted in memory and accessed by the event listener 525.

Upon detecting an input event and identifying a system response, the event listener 525 may transmit an instruction to the appropriate element or elements of the graphics controller 500. For example, if the event indicates receipt of event data, the event listener 525 may transmit a message to the storage I/O interface 520 to initiate storage of the received event data.

In some implementations, it may be advantageous to allow the display processing unit 510 to coordinate the system responses to detected events. This may be useful where multiple input signals may be received and arbitration is necessary to determine the order in which the events should be acted upon. The display processing unit 510 may be configured to manage the state changes using a state machine to represent the current status of the graphics controller 500 and possible next states.

Some events detected by the event listener 525 may be graphics control events. A display adjustment circuit 530 may be included to coordinate the adjustment of the graphic display of events from the current state to the adjusted state. The display adjustment circuit 530 may adjust the number of events displayed, the color of one or more events displayed, a plot type to use for displaying the events, the zoom level for the display, scaling, or the like.

The display adjustment circuit 530 may transmit the adjustments and an identification of the events to display to a plot generator 635. The plot generator 635 may in turn generate a computer displayable graphic representation of the event data according to the adjustments. The representation may then be provided to a display via a graphics output interface 640. The graphics output interface may be a video graphics array (VGA) interface, a high definition multimedia interface (HDMI), a wired or wireless network interface, or other communication means configured to provide graphics data, directly or indirectly, to a display device. In some implementations, the plot generator 535 may be configured to further select events to display based on the display adjustment(s) being applied.

The elements included in the graphics controller 500 may be coupled by a bus 545. The bus 545 may be a data bus, communication bus, or other bus mechanism to enable the various components of the graphics controller 500 to exchange information. It will further be appreciated that while different elements have been shown, multiple features may be combined into a single element, such as the display adjustment circuit 530 and the plot generator 535. Furthermore, additional elements may be included in the graphics controller 500 to support the features described. For example, a power source is not shown but may be included to provide power for the graphics controller 500. This can allow the graphics controller 500 to operate as a standalone graphics control hub to receive data from one or more analyzers, receive inputs from one or more input devices, and provide graphics to one or more display sources.

Figure 6:
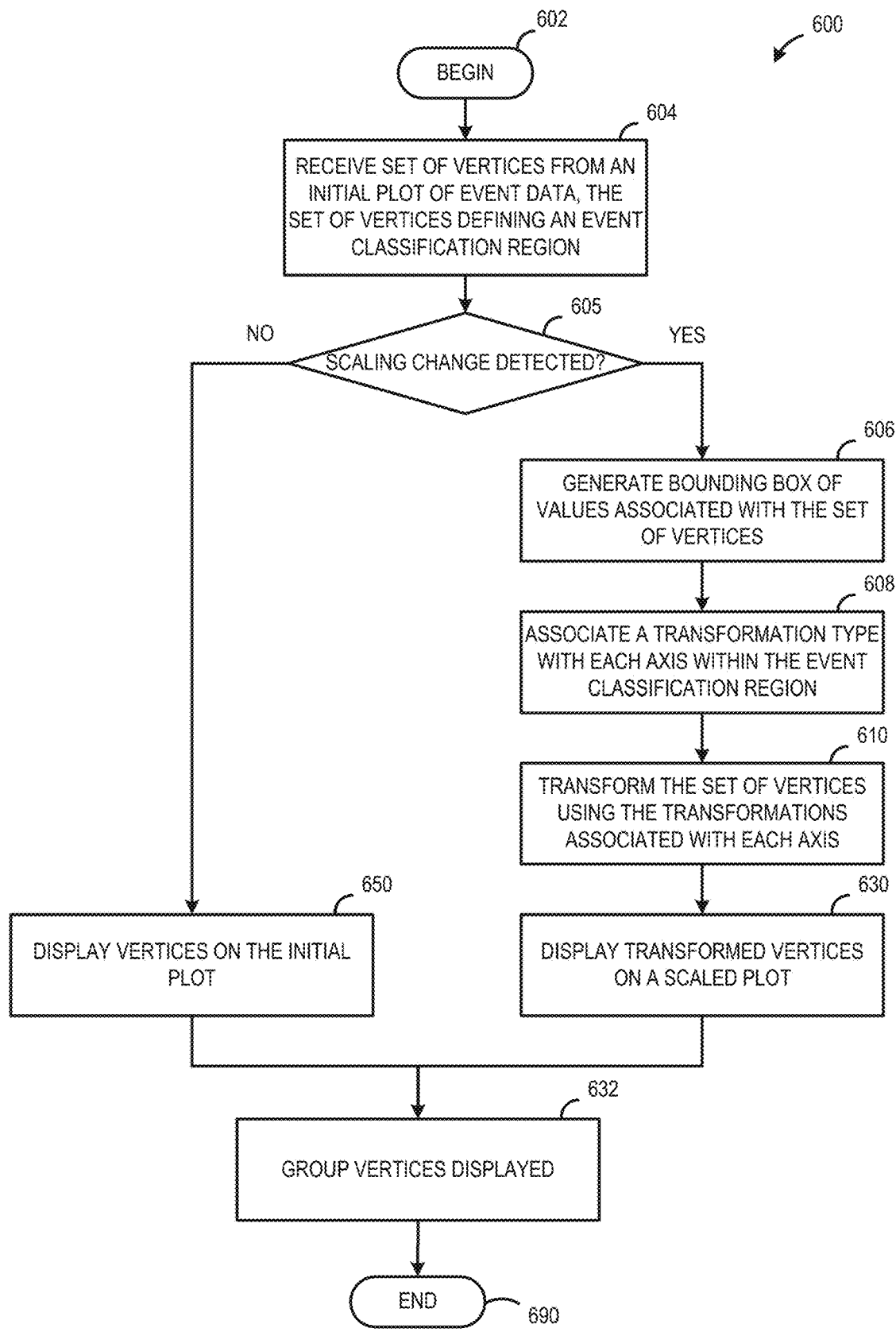
FIG. 6 shows a process flow diagram of a method of transforming a gate.

FIG. 6 shows a process flow diagram of a method of transforming a gate. The method 600 may be performed by a controlling device. The controlling device may be one or more of the devices described such as the graphics controller 290 shown in FIG. 2 or the graphics controller 500 shown in FIG. 5.

The method 600 begins at block 602. At block 604, the controlling device receives input information. The input information includes a set of vertices on an initial plot. The set of vertices represent a classification region, defined in the measurement space of an instrument (e.g., particle analyzer) after fluorescence compensation or any other processing. The input information includes information for transformations applied to the vertices of the initial plot when the classification region was drawn. For example, if the vertices were drawn on a log-log initial plot, the transformation indicated in the input information would be a logarithmic transformation.

At block 605, a determination is made as to whether any change scaling is detected. The change may be detected based on inputs received by the controlling device such as a selection of a gate or updated scaling parameter. If the determination at block 605 is negative, the method 600 may proceed to block 650 to display the classification region in the linear or unscaled form. If the determination at block 605 is negative, the method 600 may proceed to block 606.

At block 606, the controlling device calculates a bounding box of the input vertices. This bounding box defines the minimum and maximum values of all vertices for each axis shown in the initial plot.

At block 608, the controlling device associates a transformation type with each axis within the classification region. If the axis transformation is linear, then a linear hardware transformation is associated with the parameter represented by the axis. If the axis transformation is logarithmic, then a logarithmic hardware transformation is associated with the parameter represented by the axis. If the axis transformation is biexponential or a similar transform, a first symmetric log transformation is associated with negative values region, a linear transformation is associated with a region around 0, and a second symmetric log transformation is associated with positive values region. The transformations for a biexponential transform may be aligned so that overlap between the regions is minimized and that the transform switches to provide an accurate representation of the values once transformed. In some implementations, the tiles are aligned so that there is a seamless transition between sort regions. Seamless transition may include defining each ADC channel, while minimizing overlap between tiles. Overlap may not be avoided due to rounding issues but overlap can be minimized. If the hardware has limits on the affine transformations it can apply overlap may be necessary to address the limits of the hardware. For example, consider firmware where a linear tile could be adjusted but a logarithmic tile could not. In such instances, the tiling is more constrained and there would be an overlap in the low positive space of measurements.

If the hardware supports affine transformations of the bitmaps, adjust the affine transformation so that the use of the bitmaps is maximized, i.e. the bitmap boundaries align with the region bounding box. If the span across a bitmap in ADC channels is less than the bitmap resolution, optionally switch the transformation to linear for that section to maximize fidelity.

At block 610, the controlling device transforms the vertices of the gate using the source transformations for each axis within the region associated with a given vertex. Transforming the vertices may include producing a set of line segment vertices by pairing each adjacent pair of vertices and wrapping around so that the last and first vertices also produce a line segment. For each line segment, the controlling device may interpolate the line segment by sub-dividing into many line segment vertex pairs. For example, the interpolation may be a linear subdivision, or may take into account a number of steps in the target hardware space on the axis. Too many points can increase the rendering time for drawing and filling polygons. It can be desirable to avoid a fidelity higher than that for each line segment going from one pixel to an adjacent pixel. Too few points can indicate an error between gating decisions made on the tiled representation versus a bitmap on the source plot.

At block 630, the controlling device renders the set of vertices into a bitmap using a drawing algorithm (e.g., polygon scanline fill). When each pixel is rendered, the controlling device may determine which bitmap tile the pixel is within and set a flag to indicate a write to that bitmap tile. For each bitmap tile that was written into, the controlling device pairs the tile with its affine transformation and hardware axis transformations. The tile and transformations may be stored as a hardware ROI bitmap to use. The rendering at block 603 may include transforming the interpolated set of vertices into measurement space using an inverse source transformation for each axis. The rendering at block 603 may include transforming the vertices in measurement space based on a hardware transformation appropriate for the hardware performing that will perform the sorting. The rendering may also include allocating an empty bitmap that spans the hardware transform space for each axis or series of tiles.

The rendering transformation steps, or similar transformations, may be included to preserve the geometric properties of the gate in its defined transform space (i.e., the plot it was drawn on). For example, a straight line drawn in a linear/logarithmic plot becomes a curve when transformed to a linear/linear space. If this line was not interpolated and just transformed its start and end vertices, the line would define a straight line in the new space without the curve. By fragmenting the line into a series of line segments, the curvature is preserved.

In some implementations, a mathematical function may be implemented in hardware that would preserve the integrity of the vertices associated with the gate. Some implementations may define the vertices in the natural measurement space of the electronics which may be a linear space. In such implementations, the system may transform the vertices by the plot axis transformation, interpolate, and then translate back to the measurement space. From the measurement space, the system can then translate to the tiled space. Note that if the vertices were defined in the plot axis transformation space, which has happened in some implementations, one or more of the rendering transformations may be omitted. The omission may be based on detecting the transformation space associated with a set of vertices. The transformation space may be identified, for example, through metadata for the vertices or a specified format which can be detected by the system.

In some implementations, it may be desirable to group active tiles together and assign OR logic to each set of ROI bitmaps. The grouping may improve the efficiency with which the ROIs can be represented. At block 632, the controlling device may perform the grouping. Grouping at block 632 may include, if there are sufficient unused hardware ROI bitmap resources, adjusting the hardware transformation so that multiple bitmaps may sub-tile a section of the transform and re-run the algorithm. This increases fidelity.

Grouping at block 632 may include, if there are insufficient hardware ROI bitmap resources available to the particle analyzer, one or more resource conservation strategies. If the center bitmap tile in a biexponential-biexponential transformed region is completely set, the range of the surrounding bitmaps (e.g., the lin/log combination bitmaps) may be adjusted so that the bitmaps encompass zero. If the bitmap encompasses substantial amounts of negative and positive space on an axis, the linear bitmap patch may be eliminated and only positive and negative logarithmic transformations may be used. Alternatively, a single bitmap may be used with a symmetric logarithmic transformation to encompass both positive and negative space. In such instances, the controlling device may in-fill with additional bitmaps for the linear dominant regions ('donut hole').

In some implementations, the regions may be assigned to specific regions of interest for the particle analyzer to conduct sorting. The assigning of the regions may be referred to a packing process as the discrete regions are combined to a representation that can be used by the particle analyzer for sorting. This packing process groups discrete regions that represent individual tiles together to represent the region drawn in the graphics processor.

The packing process may be a recursive process that receives a list of pairs of bin position and capacity along with a list of regions including number of bitmaps required per region. The packing may produce a list of regions assigned to ROI bitmaps associated with a particle analyzer. For each bin in the list of bins, the processing may query the list of regions for the region with the largest number of bitmaps that fits within the current bin capacity. If there is a region matching this criteria, the process may output the region with the current bin position as its location, remove the region from the list of regions to process, calculate the number of unused ROI bitmaps within the bin (This is the bin capacity minus the number of ROI bitmaps required by the selected region), and split the remaining ROI bitmaps within the bin into new bins based on the power of 2 components of the remainder. For example, if 3 ROI bitmaps are left over, then this would split into bins of size 1 and 2.

These bins may be organized in ascending order of size and the position begins from the current bin position plus the number of bitmaps used by the current region. The process may be recursively executed the new list of bins and the remaining regions.

If there are any regions remaining in the list after the process exits, there may not sufficient capacity in the hardware to allocate the regions to ROI bitmaps. In such instances, the process may find unused ROI bitmap slots within the output list. The process may then assign the bitmaps within a region to non-contiguous hardware ROI bitmaps and build a truth table for the gating stage that ORs the non-contiguous regions. This can reduce the effective capacity of the gating truth table by one user defined region. For example, if a region requires 9 bitmaps, split this into two regions requiring 8 and 1 bitmap respectively. The single bitmap will tile into a spare slot if one exists and a truth table can be constructed that ORs the 8 bitmaps and 1 bitmap. Next, the process may determine which regions can be represented with fewer bitmaps. For example, it may be desirable to maintain the aspect ratio of the pixels allocated to the bitmaps for a largely rectangular region and so initially two bitmaps may be allocated but it is also possible to use a single bitmap with pixels 'stretched' across ADC channels more in one direction than another.

In some implementations, there may be unused hardware ROI bitmap slots. In such instances, the process may increase the level of detail allocated to a region by using more bitmaps and then re-running the packing process.

The control of the OR operations may be computed from the assignment of the bitmaps. For example, for an embodiment where up to 32 bitmaps are combinable with ORs, the process may compute the OR control registers. Note that the assignment of which bit controls which OR gate within a register is arbitrary, but for the purposes of this example the process selects bitmasks of 0xAAAAAAAA, 0x44444444, 0x10101010, 0x01000100 and 0x00010000 to represent the valid bits of the layers. Each layer has half the number of bits as the preceding layer.

For each pair of bitmap position and size, calculate a mask starting at position with the subsequent size bits set (e.g. position 28, size 3 would have a mask of 0x7000000)

For this mask, produce the following control register values by the following:

Control Mask 1 is (mask & (mask <<1) & 0xAAAAAAAA)
Remove bits from mask by ANDing with 0x55555555
Control Mask 2 is (mask & (mask <<2) & 0x44444444)
Remove bits from mask by ANDing with 0x11111111
Control Mask 3 is (mask & (mask <<4) & 0x10101010
Remove bits from mask by ANDing with 0x01010101
Control Mask 4 is (mask & (mask <<8) & 0x010000100
Remove bits from mask by ANDing with 0x00010001
Control Mask 5 is (mask & (mask << 16) & 0x00010000

The process may then combines all Control Mask 1 values with a logical OR operation. The process then performs a similar operation for values associated with Control Mask 2 through 5.

For this mask, produce the following control register values by the following: This process may be extended to arbitrary numbers of bitmaps. It works by checking for each set of regions whether the bit mask carries through to the next layer, initially by comparing adjacent bits. The shift and AND masks can depend on the arrangement of which bits are combined with OR gates. For example, an alternative scheme where in the first layer the lower 16 bits combine with the upper 16 bits would require a different mask and shift (shift left by 16 and mask with 0xFFFF0000, or shift right by 16 and mask with 0x0000FFFF).

Further Embodiments

Aspects of the description focus on flow cytometers and flow cytometry event data. In some embodiments, the event data may correspond to other quantitative biological data indicating expression of a particular protein or gene. For example, the event data may indicate the presence of an mRNA sequence within a cell or across a mixed population of cells. The event data may identify an absolute number of gene transcripts of a transcriptome for a cell or cells. Presentation of the event data may be adjusted per cell or per gene expression to provide different perspectives on populations of event data of particular interest (e.g., associated with a particular mRNA sequence, taken from a specific cell, etc.). The event data may be generated using massively parallel single cell analytic features such as those described in U.S. Pat. No. 9,567,645 which is hereby incorporated by reference in its entirety. One commercially available single-cell analysis system is the Becton, Dickinson Rhapsody™ hardware by Becton, Dickinson and Company of Franklin Lakes, N.J. The features discussed may be applied to visualize or gate events related to gene expression.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed graphics processor, which may include one or more processors, such as one or more digital signal processors (DSPs), configurable microprocessors, an application specific integrated circuits (ASICs), field programmable logic arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a specialized graphic control card.

Integrated Circuit Devices

Aspects of the present disclosure also include integrated circuit devices programmed to: generate a data plot comprising measurements of the detected light, where the data plot includes one or more regions each having a population of particles; calculate a set of vertices that form a boundary for each region in the data plot; identify a type of algorithmic transformation associated with each vertex in the set of vertices; and generate a bitmap of each region of particles, such that the bitmap of each region includes a set of vertices that correspond to the vertices of each region in the data plot; and identify an algorithmic transformation for applying to each vertex in the bitmap of each region. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD).

In embodiments, the integrated circuit device is programmed to generate a data plot that include one or more regions plotting a population of particles, such as two or more regions, such as three or more regions, such as four or more regions and including five or more regions. In some embodiments, the integrated circuit device is programmed to determine the boundaries of each region in the data plot. In some instances, to determine the boundary of a region of the data plot, the subject integrated circuits are programmed to calculate a set of vertices that form the boundary for each region in the data plot by determining the minimum value and maximum value along each axis of the data plot for each vertex. In these embodiments, the minimum value along the x-axis and the minimum value along the y-axis as well as the maximum value along the x-axis and the maximum value along the y-axis are determined by the system for each vertex.

In embodiments, an algorithmic transformation that is associated with the vertices of each region of the data plot is determined. Depending on the type of data plot employed (e.g., a biexponential data plot), the algorithmic transformation identified for each vertex of the data plot may vary, such as being a linear numerical transformation, a logarithmic numerical transformation or a biexponential numerical transformation. The transformation may be positive or negative depending on the particle population position on the data plot. For example, the transformation may be a positive linear, positive logarithmic, negative linear or negative logarithmic transformation.

A bitmap is generated for each particle population region in the data plot. In some embodiments, the integrated circuit is programmed to generate bitmaps that are formed from a one or more tiles. In some embodiments, two or more bitmap tiles are generated from the data plot, such as 3 or more bitmap tiles, such as 4 or more bitmap tiles, such as 5 or more bitmap tiles, such as 6 or more bitmap tiles, such as 7 or more bitmap tiles, such as 8 or more bitmap tiles and including 9 or more bitmap tiles. Each bitmap tile may include one or more vertices of the boundaries from each region of the particle population of interest, such as 2 or more vertices, such as 3 or more vertices, such as 4 or more vertices and including 5 or more vertices of each region of the particle population of interest.

In embodiments, the integrated circuit is programmed to identify an algorithmic transformation for applying to each vertex in the bitmap. Depending on the type of data plot employed (e.g., a biexponential data plot), the algorithmic transformation identified for each vertex of the bitmap may vary, such as being a linear numerical transformation, a logarithmic numerical transformation or a biexponential numerical transformation. The transformation may be positive or negative depending on the particle population position on the data plot. In some embodiments, when the algorithmic transformation associated with a vertex in the data plot is linear, the integrated circuit is programmed to identify a linear transformation for applying to the corresponding vertex in the bitmap. In other embodiments, when the algorithmic transformation associated with a vertex in the data plot is logarithmic, the integrated circuit is programmed to identify a logarithmic transformation for applying to the corresponding vertex in the bitmap. In other embodiments, when the algorithmic transformation associated with a vertex in the data plot is biexponential, the integrated circuit is programmed to identify a transformation for applying to the corresponding vertex in the bitmap that includes a symmetric logarithmic transformation, a linear transformation or a combination thereof. In one example, where the algorithmic transformation associated with a vertex in the data plot is positive linear/positive linear, the integrated circuit is programmed to identify an algorithmic transformation for applying to the corresponding vertex in the bitmap that is positive linear/positive linear. In another example, where the algorithmic transformation associated with a vertex in the data plot is positive logarithmic/positive logarithmic, the integrated circuit is programmed to identify an algorithmic transformation for applying to the corresponding vertex in the bitmap that is positive linear/positive linear. In another example, where the algorithmic transformation associated with a vertex in the data plot is positive linear/positive logarithmic, the integrated circuit is programmed to identify an algorithmic transformation for applying to the corresponding vertex in the bitmap that is positive linear/positive logarithmic. In another example, where the algorithmic transformation associated with a vertex in the data plot is positive logarithmic/positive linear, the integrated circuit is programmed to identify an algorithmic transformation for applying to the corresponding vertex in the bitmap that is positive logarithmic/positive linear. In another example, where the algorithmic transformation associated with a vertex in the data plot is negative logarithmic/positive linear, the integrated circuit is programmed to identify an algorithmic transformation for applying to the corresponding vertex in the bitmap that is negative logarithmic/positive linear. In another example, where the algorithmic transformation associated with a vertex in the data plot is positive logarithmic/negative linear, the integrated circuit is programmed to identify an algorithmic transformation for applying to the corresponding vertex in the bitmap that is positive logarithmic/negative linear. In another example, where the algorithmic transformation associated with a vertex in the data plot is negative linear/positive logarithmic, the integrated circuit is programmed to identify an algorithmic transformation for applying to the corresponding vertex in the bitmap that is negative linear/positive logarithmic. In another example, where the algorithmic transformation associated with a vertex in the data plot is positive linear/negative logarithmic, the integrated circuit is programmed to identify an algorithmic transformation for applying to the corresponding vertex in the bitmap that is positive linear/negative logarithmic. In another example, where the algorithmic transformation associated with a vertex in the data plot is negative linear/negative linear, the integrated circuit is programmed to identify an algorithmic transformation for applying to the corresponding vertex in the bitmap that is negative linear/negative linear. In another example, where the algorithmic transformation associated with a vertex in the data plot is negative logarithmic/negative logarithmic, the integrated circuit is programmed to identify an algorithmic transformation for applying to the corresponding vertex in the bitmap that is negative linear/negative linear.

In some embodiments, the integrated circuit is programmed to align the algorithmic transformations applied to the bitmap. In these embodiments, the transformations are aligned so that overlap is minimized and that the transform switches appropriately. In certain embodiments, the integrated circuit is programmed to perform an affine transformation of the bitmaps, adjust the affine transformation so that the use of the bitmaps is maximized, i.e. the bitmap boundaries align with the region bounding box.

Kits

Aspects of the present disclosure further include kits, where kits include one or more of the integrated circuit devices described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples labelled with fluorescent tags. In other embodiments, the systems and methods find use in spectroscopy of emitted light. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
    detecting light from particles in a flow stream;
    generating a data plot comprising measurements of the detected light, wherein the data plot comprises one or more regions each comprising a population of particles;
    calculating a set of vertices that form a boundary for each region in the data plot;
    identifying a type of algorithmic transformation associated with each vertex in the set of vertices;
    generating a bitmap of each region of particles, wherein the bitmap of each region comprises a set of vertices that correspond to the vertices of each region in the data plot; and
    identifying an algorithmic transformation for applying to each vertex in the bitmap of each region,
    wherein the algorithmic transformation applied to each vertex in the bitmap is the same type of algorithmic transformation associated with each corresponding vertex in the data plot.

2. The method according to claim 1, wherein detecting light from particles in the flow stream comprises light absorption, light scatter, fluorescence or a combination thereof.

3. The method according to claim 2, wherein detecting light comprises detecting side scattered light, forward scattered light or a combination thereof.

4. The method according to claim 1, wherein calculating the set of vertices that form the boundary for each region in the data plot comprises determining the minimum value and maximum value along each axis of the data plot for each vertex.

5. The method according to claim 1, wherein the algorithmic transformation associated with each vertex in the data plot is a linear numerical transformation, a logarithmic transformation or a bi-exponential transformation.

6. The method according to claim 1, further comprising aligning the algorithmic transformations applied to the bitmap.

7. The method according to claim 1, further comprising applying an affine transformation to the bitmap.

8. The method according to claim 1, wherein the method comprises generating two or more bitmap tiles from the data plot.

9. The method according to claim 8, further comprising identifying an algorithmic transformation for applying to each vertex in each bitmap tile.

10. The method according to claim 1, further comprising interpolating one or more line segments between two vertices.

11. The method according to claim 1, wherein generating the bitmap comprises a polygon drawing algorithm.

12. The method according to claim 11, wherein generating the bitmap comprises a polygon scanline fill algorithm.

13. The method according to claim 1, further comprising generating a sort decision for particles of a region based on the generated bitmap.

14. The method according to claim 13, wherein generating a sort decision comprises generating a sort configuration comprising:
    a truth table; or
    one or more logical OR gates.

15. The method according to claim 14, wherein the method comprises generating a sort configuration comprising a hierarchy of logical OR gates.

16. The method according to claim 1, wherein the particles are cells in a biological sample.

17. The method according to claim 1, wherein the bitmap and applied algorithmic transformations are generated by an integrated circuit.

18. A system comprising:
    a light source configured to irradiate particles in a flow stream;

a light detection system comprising a photodetector; and a processor comprising memory operably coupled to the processor wherein the memory comprises instructions stored thereon, which when executed by the processor, cause the processor to:

generate a data plot comprising measurements of the detected light, wherein the data plot comprises one or more regions each comprising a population of particles;

calculate a set of vertices that form a boundary for each region in the data plot;

identify a type of algorithmic transformation associated with each vertex in the set of vertices; and generate a bitmap of each region of particles, wherein the bitmap of each region comprises a set of vertices that correspond to the vertices of each region in the data plot; and identify an algorithmic transformation for applying to each vertex in the bitmap of each region, wherein the algorithmic transformation applied to each vertex in the bitmap is the same type of algorithmic transformation associated with each corresponding vertex in the data plot.

19. The system according to claim 18, wherein the light detection system comprises a photodetector configured to detect one or more of light absorption, light scatter and fluorescence.

20. An integrated circuit programmed to:

generate a data plot comprising measurements of the detected light, wherein the data plot comprises one or more regions each comprising a population of particles;

calculate a set of vertices that form a boundary for each region in the data plot;

identify a type of algorithmic transformation associated with each vertex in the set of vertices; and generate a bitmap of each region of particles, wherein the bitmap of each region comprises a set of vertices that correspond to the vertices of each region in the data plot; and identify an algorithmic transformation for applying to each vertex in the bitmap of each region, wherein the algorithmic transformation applied to each vertex in the bitmap is the same type of algorithmic transformation associated with each corresponding vertex in the data plot.

* * * * *